US006529230B1

(12) United States Patent
Chong

(10) Patent No.: US 6,529,230 B1
(45) Date of Patent: Mar. 4, 2003

(54) SECURITY AND FIRE CONTROL SYSTEM

(75) Inventor: Yuen Thub William Chong, Singapore (SG)

(73) Assignee: Safe-T-Net Systems PTE LTD, Singapore (SG)

( * ) Notice: Subject to any disclaimer, the term of this patent is extended or adjusted under 35 U.S.C. 154(b) by 0 days.

(21) Appl. No.: 09/608,021

(22) Filed: Jun. 30, 2000

Related U.S. Application Data

(62) Division of application No. 09/386,078, filed on Aug. 30, 1999.

(51) Int. Cl.[7] .................................................. H04N 7/14
(52) U.S. Cl. ................. 348/14.01; 379/37; 379/102.01; 379/43
(58) Field of Search .............................. 379/37, 38, 39, 379/40, 41, 42, 43, 44, 46, 47, 48, 50, 51, 102.01, 102.02, 102.05; 348/14.01; H04N 7/14

(56) References Cited

U.S. PATENT DOCUMENTS

| | | | |
|---|---|---|---|
| 3,848,084 A | 11/1974 | Rodda et al. ................. 178/6.8 |
| 3,946,159 A | 3/1976 | Fay ........................... 179/2 TV |
| 5,202,759 A | 4/1993 | Laycock ...................... 358/108 |
| 5,305,100 A | 4/1994 | Choi ........................... 348/159 |
| 5,412,708 A | 5/1995 | Katz ............................ 348/14 |
| 5,544,649 A | 8/1996 | David et al. ................. 128/630 |
| 5,612,994 A | 3/1997 | Chen ........................... 379/167 |
| 5,677,727 A | 10/1997 | Gotoh et al. | |
| 5,703,636 A | 12/1997 | Cifaldi ........................ 348/14 |
| 5,717,379 A | 2/1998 | Peters ......................... 340/539 |
| 5,748,072 A | * | 5/1998 | Wang ..................... 340/286.05 |

(List continued on next page.)

FOREIGN PATENT DOCUMENTS

| | | | |
|---|---|---|---|
| CA | 0308046 A2 | * 3/1989 | ............ G08B/18/00 |
| JP | 403230297 A | * 10/1991 | ............ G08B/25/08 |
| JP | 406303651 A | * 10/1994 | ............ H04N/7/16 |
| JP | 406338957 A | * 12/1994 | ........... H04M/11/00 |
| JP | 407015538 A | 1/1995 | |
| JP | 407098792 A | * 4/1995 | ............ G08B/25/00 |
| JP | 407298241 A | * 11/1995 | ............ H04N/7/15 |
| JP | 410107889 A | 4/1998 | |
| JP | 411206014 A | 7/1999 | |
| WO | WO 97/34252 | 9/1997 | |
| WO | WO 99/07143 | 2/1999 | |

OTHER PUBLICATIONS

Leadtek Research Inc., Product Descriptions, "Product Family, Communication Product Family," "TeleEYE, ISDN," "TeleEye 3245 TeleEye AE," Taipei, TAiwan, R.O.C.
Product Descriptions, "TeleEAR (ATU–1)," "TeleEye Pro (Model: CCU–1)," "TeleEye Pro."
Product Descriptions, "RSM–1600 Master Transceiver," "RSM–700 Video/Alarm Expander."

(List continued on next page.)

*Primary Examiner*—Melur Ramakrishnaiah
(74) *Attorney, Agent, or Firm*—Christie, Parker & Hale, LLP

(57) ABSTRACT

A remote surveillance and conferencing system includes video transceivers and provides audiovisual communications over a standard Public Switched Telephone Network (PSTN). The system provides capabilities for closed circuit television (CCTV) applications, security systems, video conferencing, remote video surveillance, home automation and fire control, all in one, without requiring a use of computer. Each video transceiver includes a dedicated keypad which allows users to use the system without a telephone. Keypad controllers available to some of the video transceivers provide a capability to remotely control the system.

38 Claims, 25 Drawing Sheets

U.S. PATENT DOCUMENTS

| | | | |
|---|---|---|---|
| 5,786,746 A | | 7/1998 | Lombardo et al. ...... 340/286.07 |
| 5,838,250 A | * | 11/1998 | Maekawa .............. 340/825.07 |
| 5,867,209 A | | 2/1999 | Irie et al. ....................... 348/19 |
| 5,898,457 A | | 4/1999 | Nagao et al. |
| 6,037,970 A | | 3/2000 | Kondo |
| 6,128,033 A | | 10/2000 | Friedel et al. |
| 6,163,335 A | | 12/2000 | Barraclough |
| 6,201,562 B1 | | 3/2001 | Lor |

OTHER PUBLICATIONS

Kato, Masami et al., Visual Communication System in an Apartment House Using Only Twisted Paired Cable; IEEE Transactions on Consumer Electronics; pp. 418–426; New York, US, Aug. 1994.

Balakrishnan, Mahesh, et al., Digital Video and the National Information Infrastructure, Philips Journal Research, vol. 50 No. 1/2, New York, pp. 105–129, 1996.

* cited by examiner

POINT TO POINT TWO-WAY COMMUNICATION SYSTEM

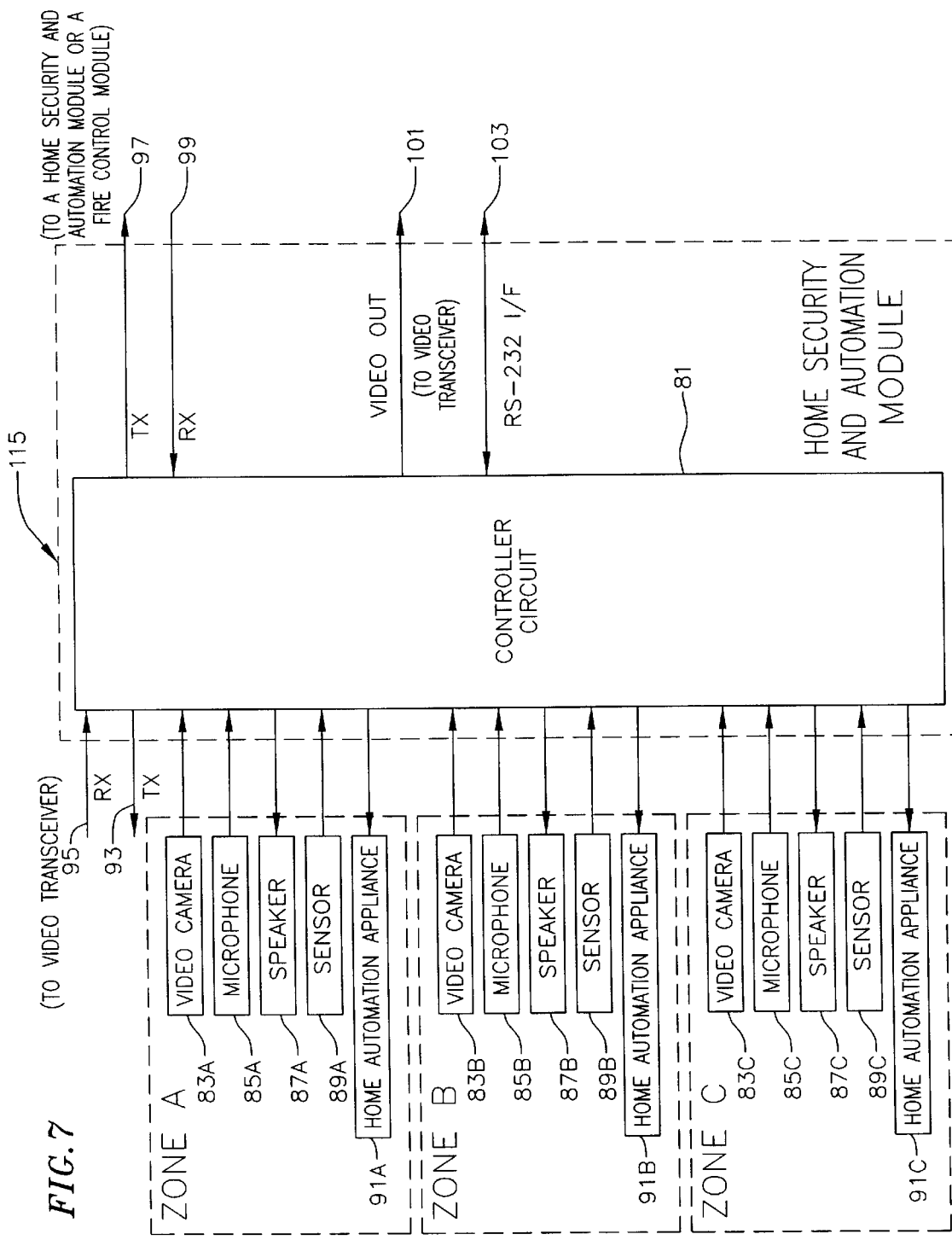

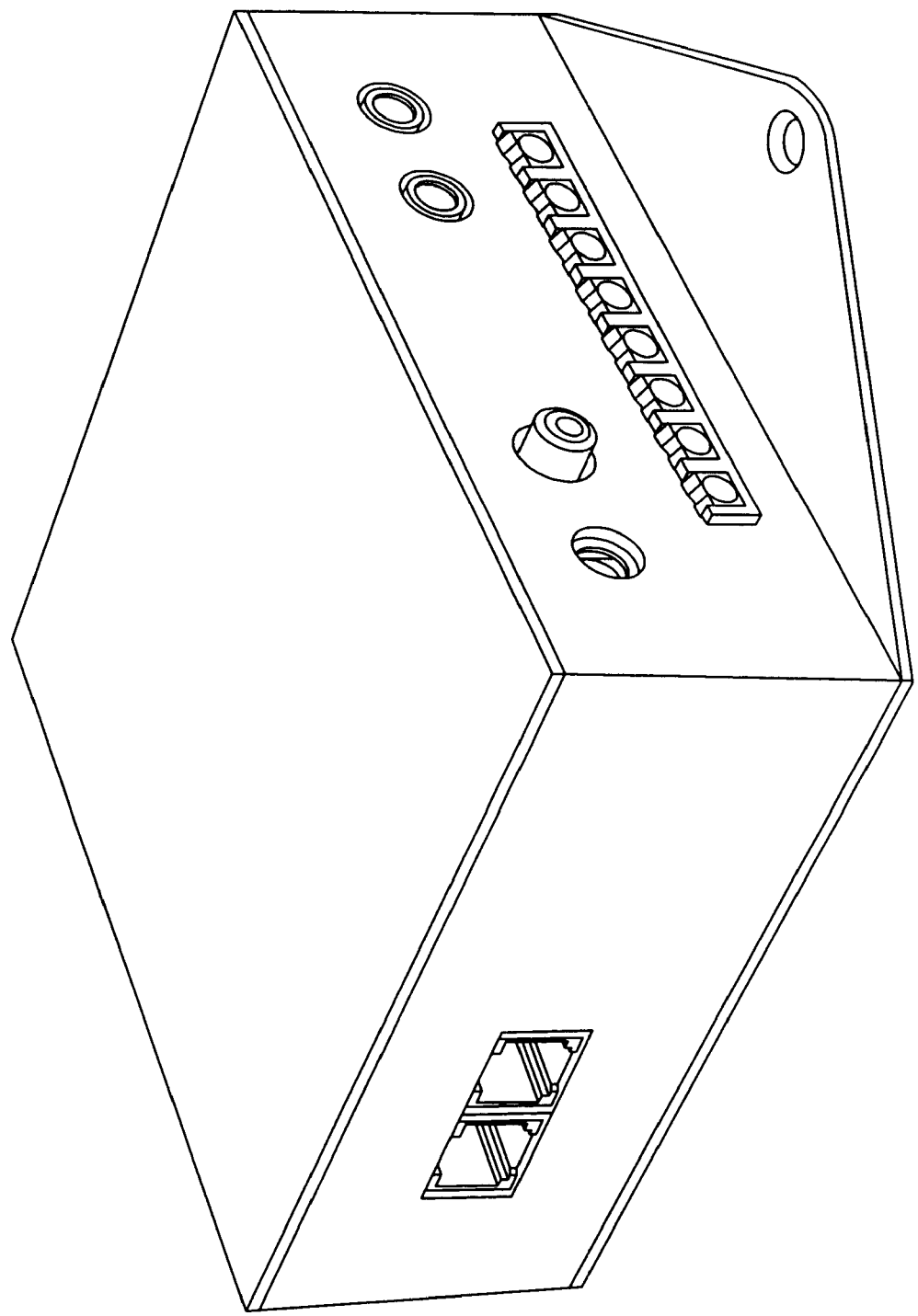

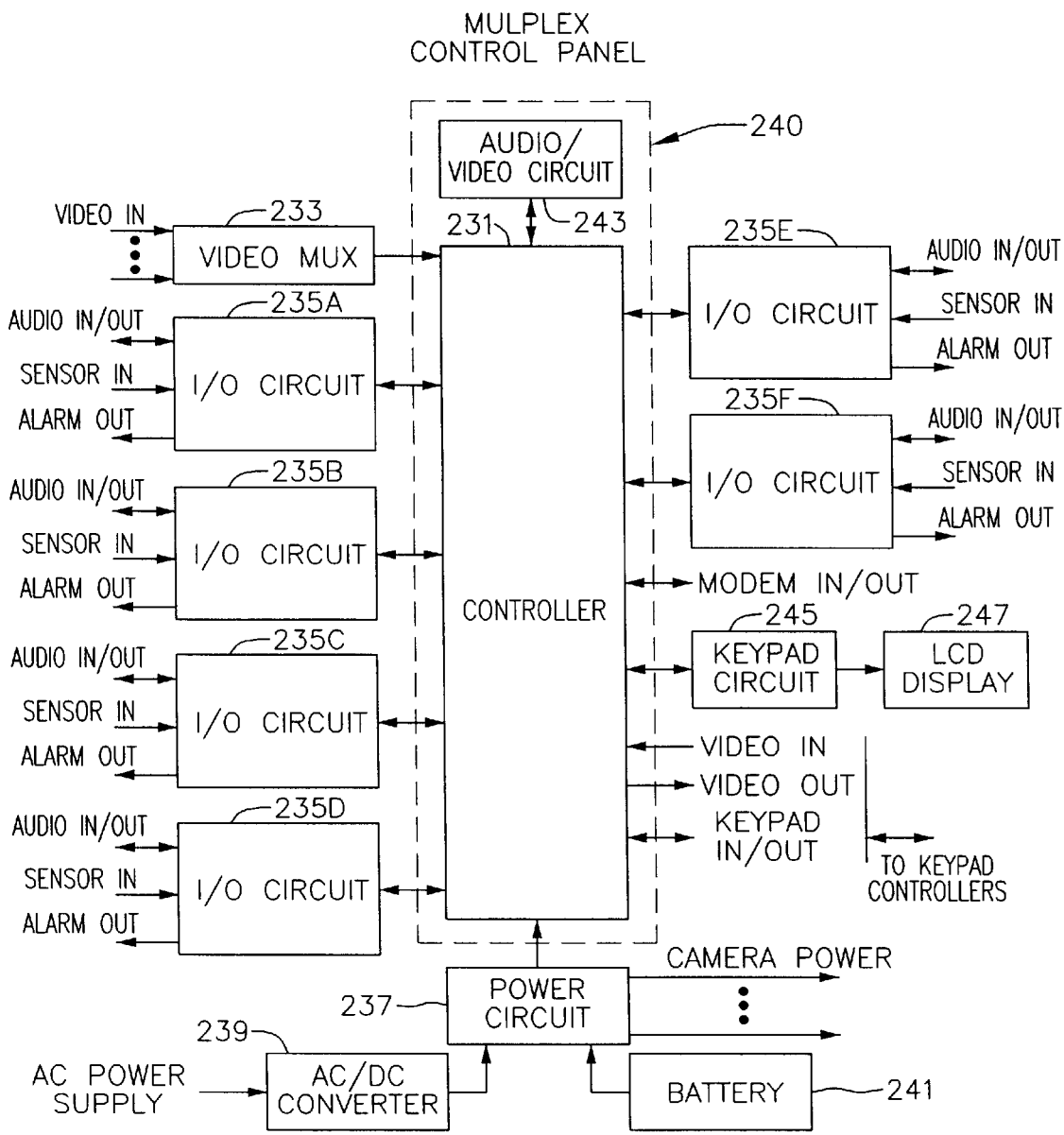

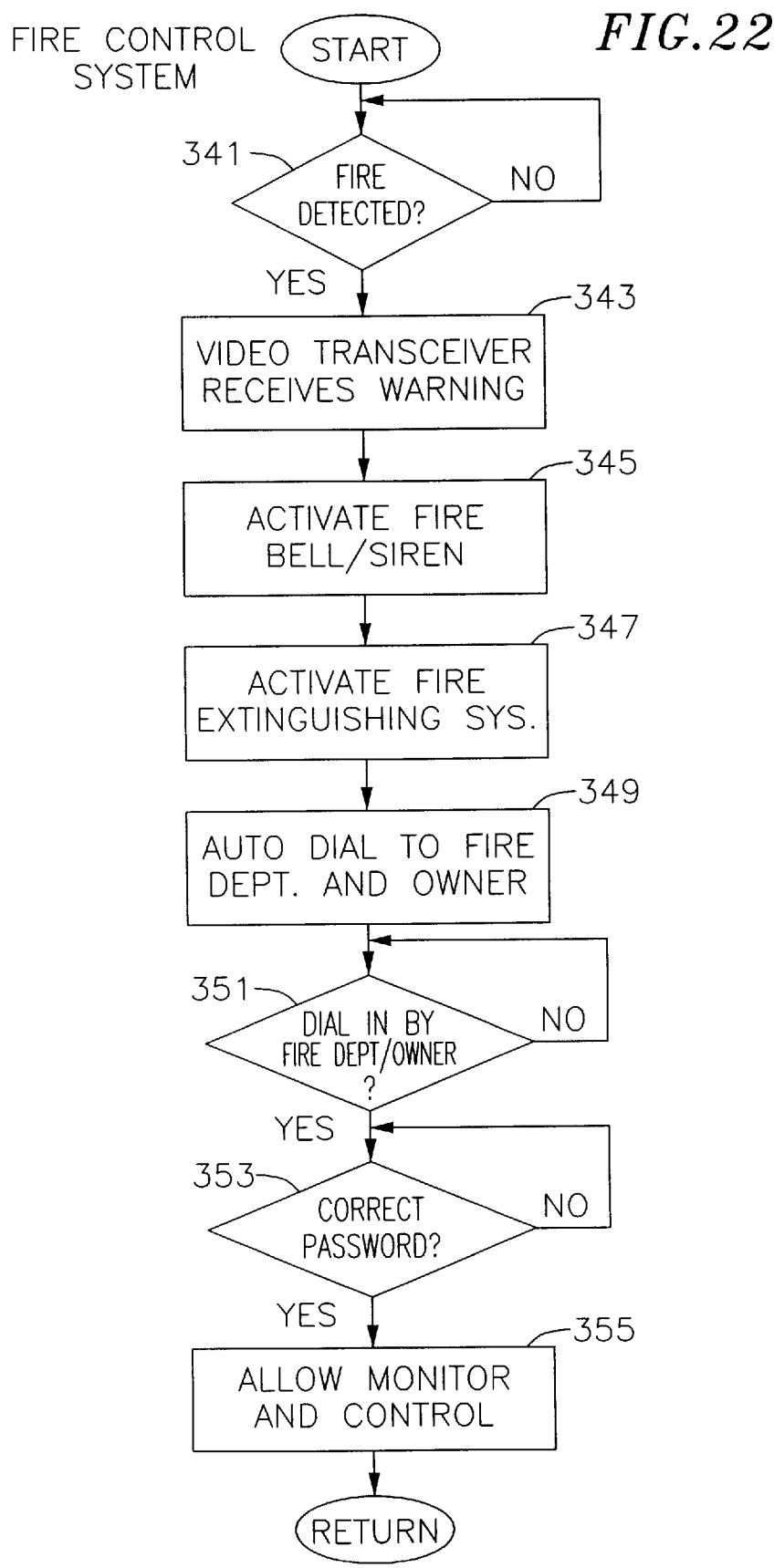

SECURITY AND FIRE CONTROL SYSTEM

This patent application is a divisional patent application of U.S. patent application Ser. No. 09/386,078 filed Aug. 30, 1999.

BACKGROUND

Videophone products have been available to consumers for a number of years. However, earlier videophone products usually required a use of Integrated Service Digital Network (ISDN) digital phone lines which have a broader bandwidth than analog telephone lines, i.e., Public Switching Telephone Network (PSTN) phone lines. Communications over the ISDN digital phone lines are expensive, and they are not universally available.

With the advent of relatively fast modems, e.g., 28.8 k bps modems, it became possible to send video as well as audio information over the PSTN analog phone lines. However, the use of videophones over the PSTN analog phone lines had many drawbacks.

First, because of the bandwidth limitation and lack of defined standard of video quality, the quality of the video was very poor. Second, because of a lack of standardization of communications protocol, manufacturers were producing videophone products that are not interoperable with each other, i.e., a videophone manufactured by one manufacturer was not able to communicate with another videophone manufactured by another manufacturer.

In order to allow for an interoperable, quality audiovisual communications over a PSTN analog phone line, the International Telecommunications Union (ITU) recently has adopted a new standard called H.324. The H.324 protocol, adopted by the ITU, is now the standard for audiovisual/multimedia communications over the PSTN analog phone lines. This new standard allows for interoperability and high quality video, voice, and data based phone calls. The H.324 standard makes it possible for a common method transmission of video, voice, and data simultaneously over a high-speed modem connection.

Ever since the adoption of the H.324 standard, some products based on this new standard have become available to consumers, and others are being developed by various different manufacturers. Some of the applications these new products are directed to are video conferencing, remote video surveillance, security system monitoring and closed circuit television (CCTV). In addition, there are needs for products which can be used in fire control and home automation applications.

Even though there are some products in the market place today that are designed for one or more of the above applications, there is no product which could provide capabilities to perform all six of the above functions simultaneously. In addition, use of these products are cumbersome because they do not provide a dedicated interface unit, instead relying on a telephone keypad or a computer keyboard for user control input and a phone headset or a computer for transmitting and receiving voice. Furthermore, many of these products require a use of a computer for proper operation. Therefore, there is a current need for a self-contained video transceiver for multi-functional applications.

SUMMARY OF THE INVENTION

An embodiment of the present invention is directed to a video transceiver which satisfies this need. In one embodiment, a video transceiver includes a keypad for entering a telephone number, and a transceiver circuit capable of formatting a video input, an audio input and the entered telephone number for transmission on a PSTN telephone line. The transceiver circuit is also capable of extracting a PSTN telephone line input comprising a video signal, an audio signal and a telephone number identifying the video transceiver. Preferably, the video transceiver includes an indicator which indicates when the telephone number identifying the video transceiver is extracted by the video transceiver.

In alternative embodiments of the present invention, the video transceiver is employed in numerous applications. By way of example, in one embodiment, a video transceiver having a keypad is coupled to a detector and an indicator which is responsive to the detector. The video transceiver includes a transceiver circuit which dials a telephone number in response to the detector, and couples an output of the detector to a PSTN telephone line. Preferably, an interface module is used to couple the detector and the indicator to the video transceiver. A video camera output may also be coupled to the PSTN telephone line through the video transceiver in response to the detector and recorded by a video cassette recorder.

In an alternative embodiment, a video transceiver is coupled to the PSTN telephone line. The video transceiver includes a keypad and a transceiver circuit capable of extracting an appliance control signal from the PSTN telephone line. An appliance, responsive to the extracted appliance control signal, is coupled to the video transceiver. Preferably, an interface module is used to couple the video transceiver to the appliance.

In another embodiment, a video transceiver is coupled to the PSTN telephone line. The video transceiver includes a keypad and a transceiver circuit capable of extracting a number of appliance control signals from the PSTN telephone line. The appliances are preferably coupled to the video transceiver through an interface module, and are responsive to their respective extracted appliance control signals.

In yet another embodiment, a multiplex video transceiver is coupled to a number of keypad controllers. Each keypad controller is coupled to a video camera, a television monitor, a speaker, and a microphone. The multiplex video transceiver is coupled to a video transceiver having a keypad on a PSTN telephone line. Preferably, the video transceiver also includes a video camera, a television monitor, a speaker, and a microphone.

The described embodiments are multi-functional systems capable of performing video conferencing, remote video surveillance, security system monitoring, and CCTV applications as well as capabilities for fire control and home automation. The dedicated keypad of the video transceiver eliminates the need for using a telephone keypad for user control. Finally, the integration of a speaker and microphone into the video transceiver eliminates the need to rely on a telephone headset or a computer for voice communications.

It is understood that other embodiments of the present invention will become readily apparent to those skilled in the art from the following detailed description, wherein it is shown and described only embodiments of the invention by way of illustration of the best modes contemplated for carrying out the invention. As will be realized, the invention is capable of other and different embodiments and its several details are capable of modification in various other respects, all without departing from the spirit and scope of the present

DESCRIPTION OF THE DRAWINGS

These and other features, aspects, and advantages of the present invention will become better understood with regard to the following description, appended claims, and accompanying drawings where:

FIG. 7 is a simplified block diagram of a home security and automation module.

FIG. 7A is a typical packaging of a home security and automation module.

FIG. 14 is a system block diagram of a multiplex video transceiver.

FIG. 22 is a flow diagram of a fire control system.

DETAILED DESCRIPTION

Figure 1:
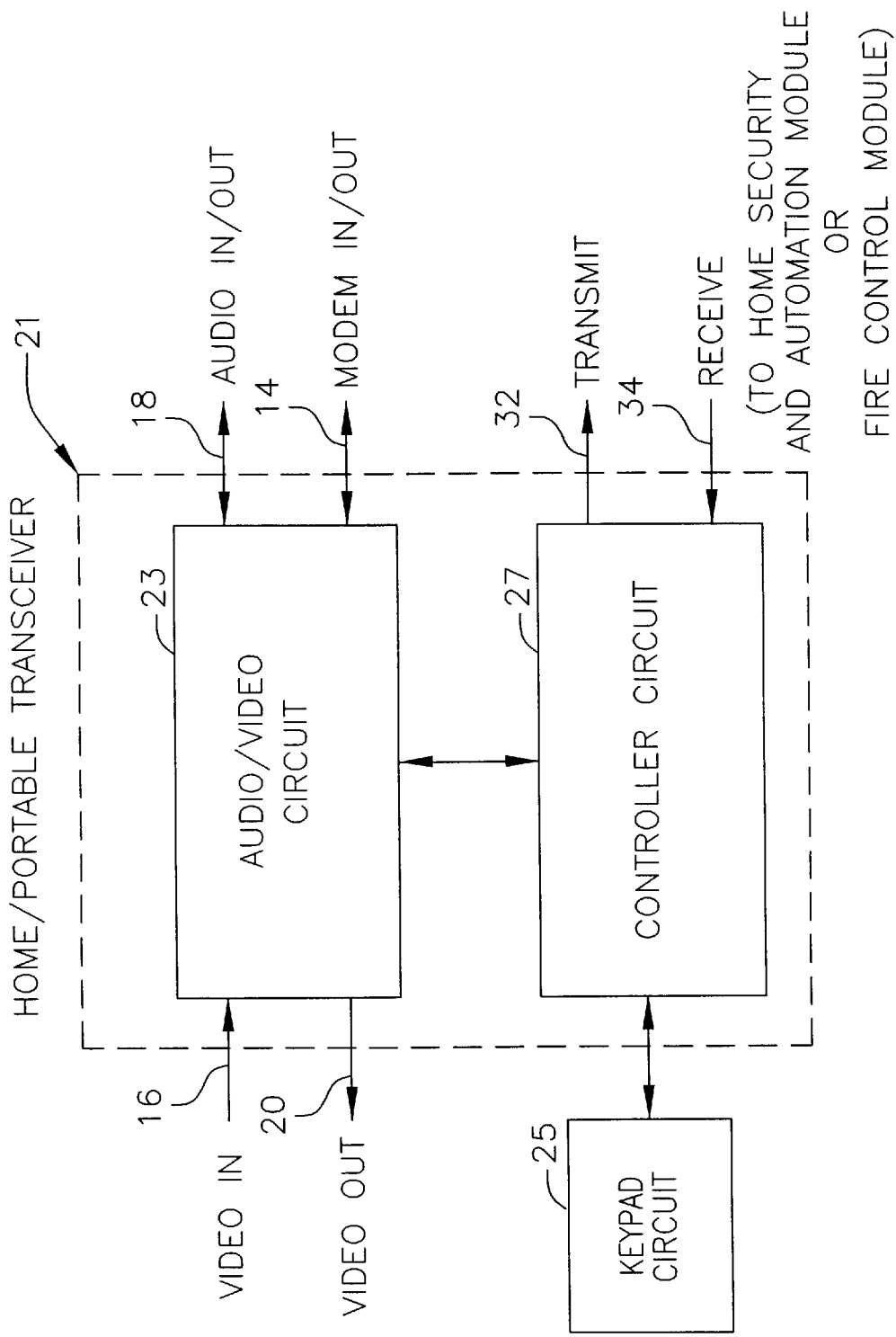
FIG. 1 is a functional block diagram of a video transceiver.

FIG. 1 is a functional block diagram of a video transceiver. The video transceiver is used to transmit and receive audio and video signals over a Public Switching Telephone Network (PSTN). Those skilled in the art will appreciate that the video transceiver can easily be adapted to work on ISDN and ADSL telephone lines as well.

The video transceiver includes a keypad circuit 25 which provides a user interface to a transceiver circuit 21. The transceiver circuit includes an audio/video circuit 23 coupled to a controller circuit 27. The controller circuit 27 is responsible for managing all operations of the video transceiver and coordinating the flow of data into and out of the system. The controller circuit 27 preferably includes memory (not shown) for storing a number of telephone numbers that are automatically dialed by the audio/video circuit 23 upon the occurrence of a certain event. Alternatively, the controller circuit 27 commands the audio/video circuit 23 to dial the telephone number inputted by the user on the keypad circuit 25. The audio/video circuit 23 accepts commands from the controller 27 and provides an interface to the PSTN telephone line.

During transmission, the audio/video circuit will accept video and audio inputs from external sources and commands from the controller circuit 27 and format the information for delivery over the PSTN telephone line through the modem in/out line 14. The video input 16 is typically a video camera signal having a standard video output such as NTSC or PAL. NTSC and PAL are video standards well known in the art that specify line and field rates and include color information encoding. These standards provide composite video signal for luminance and color information together in one signal. An NTSC compatible system operates with 525 lines per frame and 30 frames per second. A PAL compatible system operates with 625 lines per frame and 25 frames per second. The audio input 18 typically comprises voice or speech signals that vary in amplitude and frequency.

When receiving, incoming signals on the PSTN telephone line through the modem in/out line 14 will be separated into video and audio signals, processed, and delivered to the video and audio outputs. The video output 20 is preferably a standard video signal, such as PAL or NTSC, with sufficient drive for a television monitor. The audio output 18 is typically comprises voice or speech signals capable of driving an audio speaker.

The controller circuit 27 also has provisions for dedicated transmit and receive lines 32, 34. The transmit and receive lines can be used to connect the controller circuit 27 to other modules to increase functionality of the video transceiver. Exemplary modules include a home security and automation module, and a fire control module. Both of these modules are described in detail below.

Figure 2:
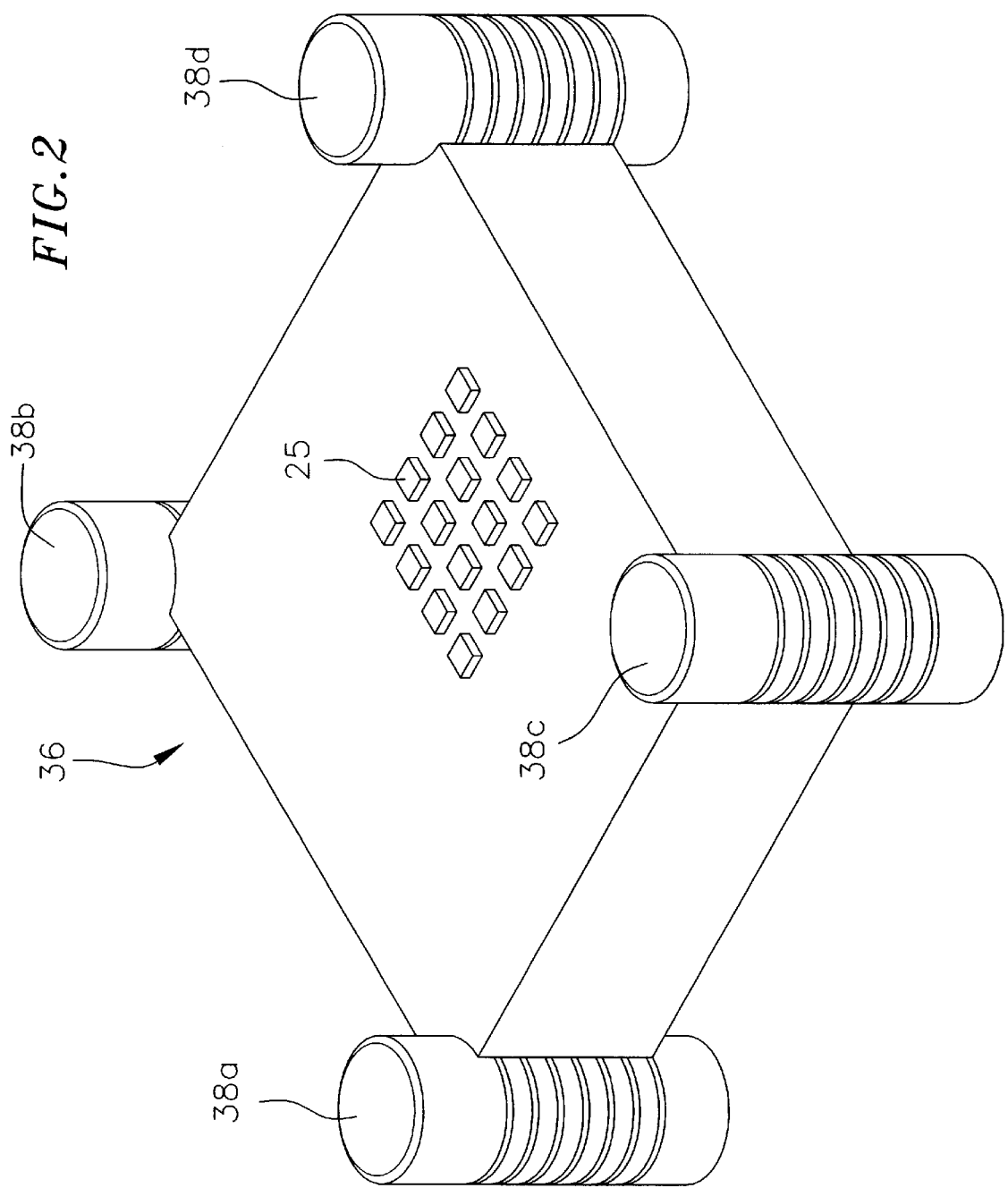
FIG. 2 is a typical packaging for a home transceiver.
Figure 3:
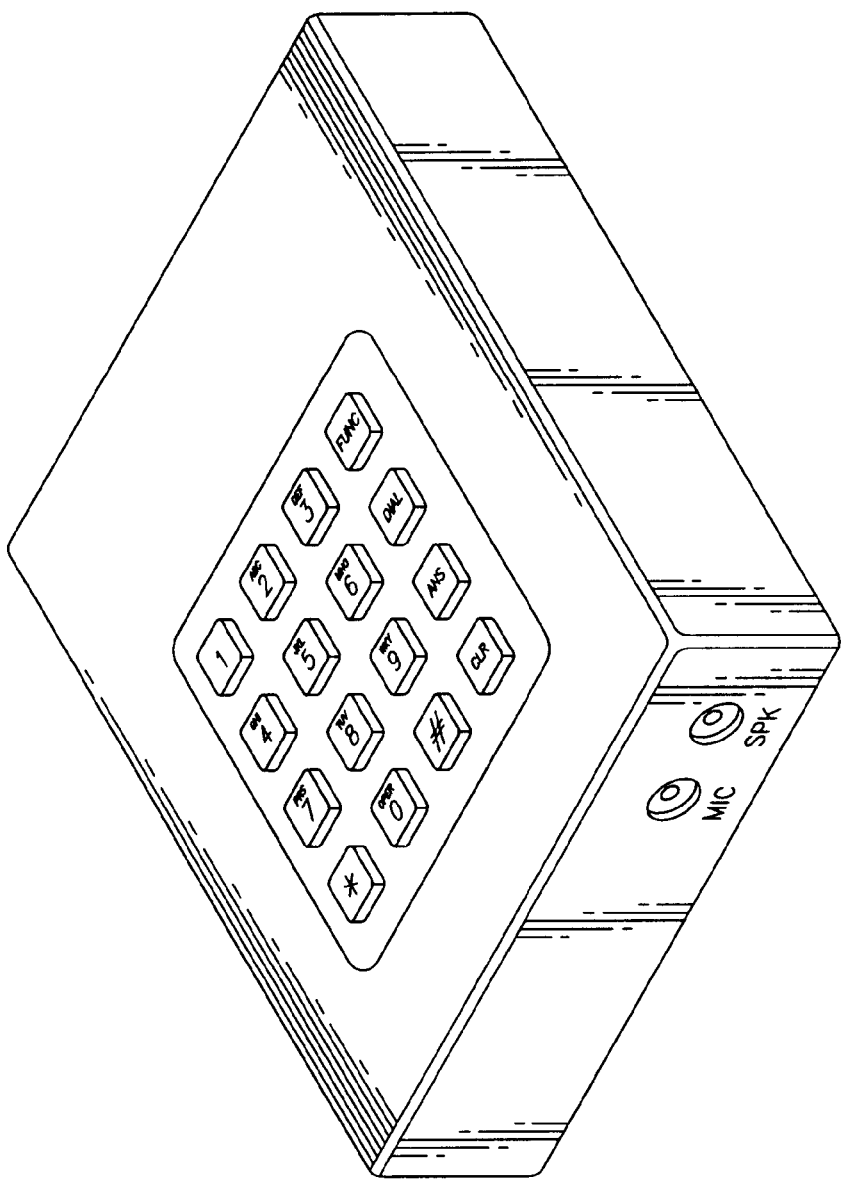
FIG. 3 is a typical packaging for a portable transceiver.

The video transceiver preferably has high density packaging with a light weight construction for home and portable applications. Referring to FIG. 2, the video transceiver is shown with an exterior housing 36 formed of a suitably sturdy material and includes an upward facing keypad 25. The housing 36 also includes four stands 38a, 38b, 38c, 38d to support the housing 36 above the operating surface. The four stands 38a, 38b, 38c, 38d can be eliminated to enhance the portability of the video transceiver. FIG. 3 shows a portable video transceiver constructed to sit directly on a desktop or other operating surface. Exemplary dimensions of the housing are 8.7 inches long by 8.7 inches wide and 3.3 inches high.

Figure 4:
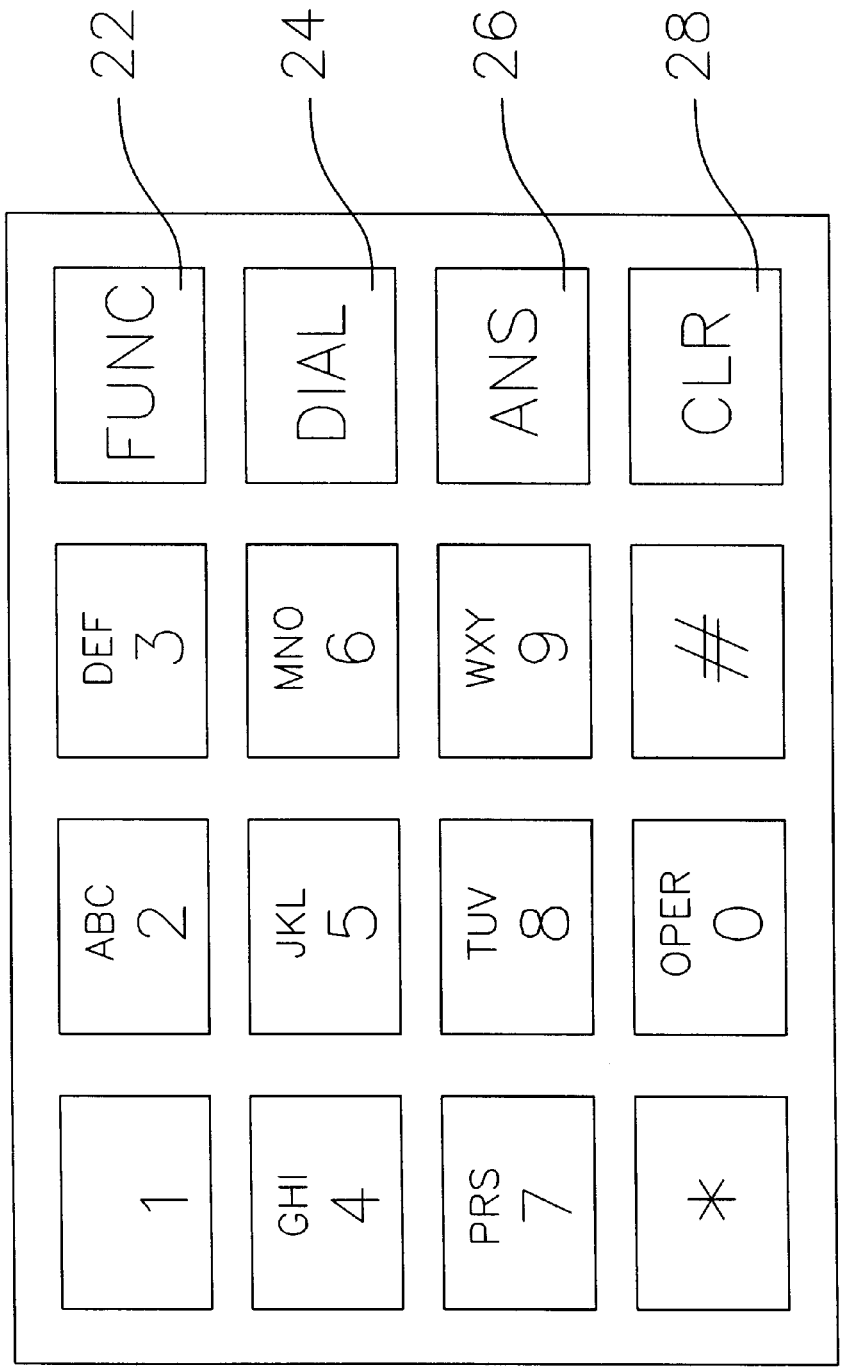
FIG. 4 is a keypad layout of a video transceiver.

FIG. 4 illustrates a typical layout of the keypads on the video transceiver. The keypad has ten alphanumeric keys as well as '*' and '#' keys which are common to many push-button type telephones. In addition, the keypad includes a function key 'FUNC' 22, a dial key 'DIAL' 24, an answer key 'ANS' 26 and a clear key 'CLR' 28. The integrated keypad eliminates the need to use a telephone or a computer keyboard as an input device.

The alphanumeric keys are used to enter user inputs such as telephone numbers and passwords. The FUNC key 22, the DIAL key 24, the ANS key 26 and the CLR key 28 are used to enter control command inputs. The FUNC key is used to establish communications and also to select different modes of operation. The DIAL key is pressed before entering a telephone number to initiate a call. The ANS key is used to answer a call. The CLR key is used to indicate the end of communications.

Figure 5:
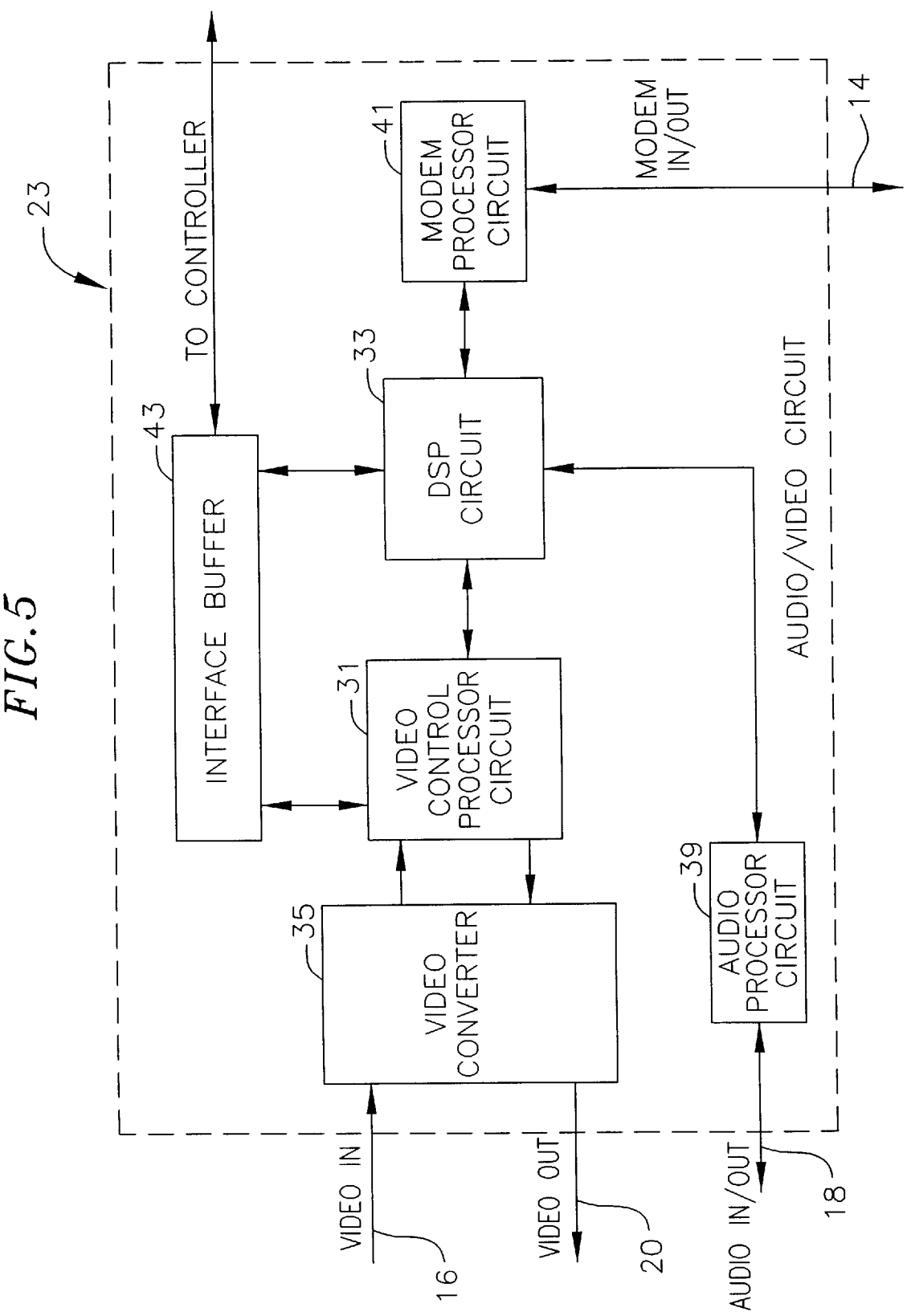
FIG. 5 is a system block diagram of an audio/video circuit.

FIG. 5 is a system block diagram of the audio/video circuit 23. During the transmission operation, a video input 16, such as a PAL or NTSC video signal, is applied to the input of a video converter 35. In some applications, the video converter 35 is equipped with input multiplexing capability to allow video inputs from a number of video sources. The video signal is amplified, filtered, and converted to a digital video signal by the video converter 35. The digital video signal is then coupled to the video control processor circuit 31.

An audio input 18, typically speech or voice signals, is applied to an audio processor 39. The audio processor 39 provides initial amplification and includes a bandpass filter designed to pass voice frequencies and limit unwanted circuit noise. Typically, the bandpass circuit (not shown) is designed to pass frequencies in the range of 300 to 3,000 Hz. The in-band signal from the bandpass filter is converted to a digital audio signal by the audio processor and provided to the DSP circuit 33.

The video control processor circuit 31 manages the flow of digital video into the digital signal processor (DSP) 33 under control of the controller circuit 27 (See FIG. 1). An interface buffer 43 is used to provide an interface between the video control processor circuit 31 and the controller 27 (See FIG. 1). The interface buffer 43 also provides temporary storage of the digital video. Preferably, the interface buffer is a dual port RAM where both the controller circuit 27 (see FIG. 1) and the DSP circuit 33 can have access at the same time.

The output of the video control processor circuit 31 is coupled to the DSP 33 for data compression. The digital video is compressed in accordance with a H.263 video compression format which is a new standard format for transmitting video data over the PSTN telephone line. The H.263 video compression format is an International Telecommunications Union (ITU) standard for "Video Coding for Low Bit Rate Communication" and is well known to those with ordinary skill in the art.

In the DSP circuit 33, the compressed digital video signals are integrated with the digital audio signals into a format compatible with a H.324 protocol for transmitting and receiving audio and video data over the PSTN. The formatted H.324 compatible signals are then sent to the modem processor circuit 41 for modulation and transmission out of the modem in/out line 14. Preferably the modem used is a 33.6 kbps, V.34bis modem which is compatible with the H.324 format.

During the receiving operation, the modem processor circuit 41 receives input signals over the PSTN through the modem in/out line 14. The input signals are demodulated and sent to the DSP circuit 33. The DSP circuit 33 extracts a digital video signal and a digital audio signal. The digital video signal, which is configured in the H.263 video compression format, is decompressed by the DSP circuit 33.

The DSP circuit 33 provides the digital audio signal, which has been extracted, to the audio processor circuit 39. The video control processor circuit 31, under control of the controller circuit 27 (see FIG. 1), manages the flow of digital decompressed digital video from the DSP circuit 33 to the video converter 35. The flow of decompressed digital video from the DSP circuit 33 to the video converter 35 is facilitated by use of the interface buffer 43 which provides temporary storage.

The decompressed digital video signal is converted to an analog signal, amplified and filtered at the video converter 35. A demultiplexer (not shown) may also be provided by the video converter to handle a decompressed multiplexed digital video signal. The video output 20, which could include a number of demultiplexed video outputs, is preferably a television monitor compatible signal having a PAL or NTSC format.

The digital audio signal is converted to an analog signal, filtered, amplified into an audio signal suitable for driving an audio speaker at the audio processor 39. The speaker compatible signal is outputted onto the audio in/out line 18.

Figure 6:
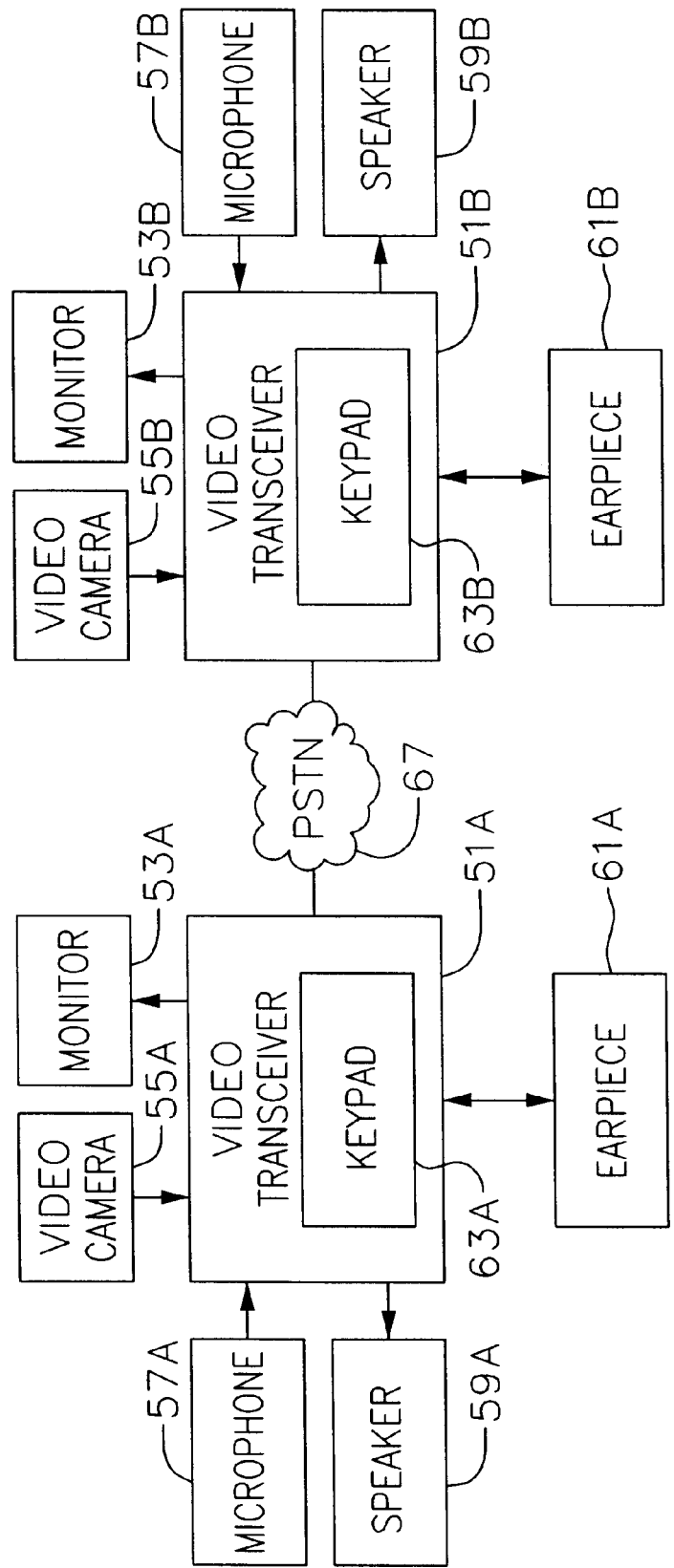
FIG. 6 is an audiovisual communications system with two video transceivers connected in a point-to-point communication system over a PSTN.

The described embodiment of the video transceiver can be used in numerous applications. By way of example, audiovisual communications can be established over a PSTN telephone line using two video transceivers. Although a computer or a telephone may be used during such audiovisual communications, neither is required. FIG. 6 shows two video transceivers 51A and 51B in a point-to-point communication system over a PSTN telephone line 67. The video transceivers include keypads 63A and 63B, respectively. Those skilled in the art will appreciate that any number of transceivers can be connected to the PSTN telephone to conduct, by way of example, video conferencing among a number of participants at various locations.

The advantages of the video transceivers in audiovisual communications are best realized by employing a number of peripheral devices. For example, in a preferred embodiment, each of two video transceivers 51A and 51B is connected respectively to a monitor 53A, 53B, a video camera 55A, 55B, a microphone 57A, 57B, a speaker 59A, 59B and an earpiece 61A, 61B.

In one embodiment of the present invention, the microphones 57A, 57B and the speakers 59A, 59B are integrated into their respective video transceivers 51A, 51B. In another embodiment of the present invention, the microphones 57A, 57B and the speakers 59A, 59B are standalone units.

The monitors 53A, 53B may be standard television sets or they may be computer monitors. The video transceivers 51A, 51B have an adaptive video output for interfacing with a television set employing any number of standard video signal formats including PAL and NTSC, or alternatively, a computer utilizing a Universal Serial Bus (USB).

The video cameras 55A, 55B can be any commercially available cameras having a PAL or NTSC video camera output, or any other standard format. Preferably the video cameras have color CMOS image sensors in ⅓" format and generate composite NTSC/PAL or S-Video signals. A split screen configuration may be employed to handle a number video signals. By way of example, video transceiver 51A could be configured with multiple video cameras which are multiplexed by the video transceiver 51A, transmitted over the PSTN telephone line 67, and demultiplexed by the video transceiver 51B in a manner described above in connection with FIG. 5. The demultiplexed video signals from the video transceiver 51B could be connected to additional television monitors, or alternatively, formatted into a split screen configuration.

Those with ordinary skill in the art can appreciate that number of cameras that could be coupled to a single video transceiver can easily be varied. Moreover, additional video camera can be added by including additional input channels and modify internal circuits to handle the multiplexing of additional video signal inputs. One earpiece can replace one speaker and one microphone.

Each of the earpieces 61A, 61B contains a microphone and a speaker, and can be placed in position for hands-free operation. The earpiece, when used, allows private listening unlike the speaker.

Increased functionality can be achieved by utilizing a home security and automation module ("automation module") with the video transceiver. A simplified block diagram of the automation module is illustrated in FIG. 7. FIG. 7A is a typical packaging of the automation module.

The automation module 115 includes a controller circuit 81 which has two pairs of dedicated transmit and receive lines 93, 95 and 97, 99 in addition to a video signal output 101. The controller circuit 81 also has bi-directional capability utilizing a RS-232 interface 103 which can be used to re-program the automation module 115 from a computer.

The controller circuit 81 includes provisions to support three video cameras 83A, 83B, 83C, three microphones 85A, 85B, 85C, three speakers 87A, 87B, 87C, three sensors 89A, 89B, 89C and three home automation appliances 91A, 91B, 91C. In the described embodiment, the viewing zones are shown in FIG. 7 with each zone having one video camera, one microphone, one speaker, one sensor and one home automation appliance. The transmit and receive lines 97, 99 are used to connect the automation module 115 to another automation module or a fire control module. Therefore, the automation modules and fire control modules can be connected in series to a single video transceiver. The other transmit and receive lines 93, 95 are for connection to the controller circuit 27 of the video transceiver (see FIG. 1). The controller circuit of the video transceiver manages the flow of video and audio out of the automation module 115. By way of example, the controller circuit 115 includes a multiplexer (not shown) for multiplexing the video and audio from one of the zones in response to instructions from controller circuit 27 of the video transceiver.

Figure 8:
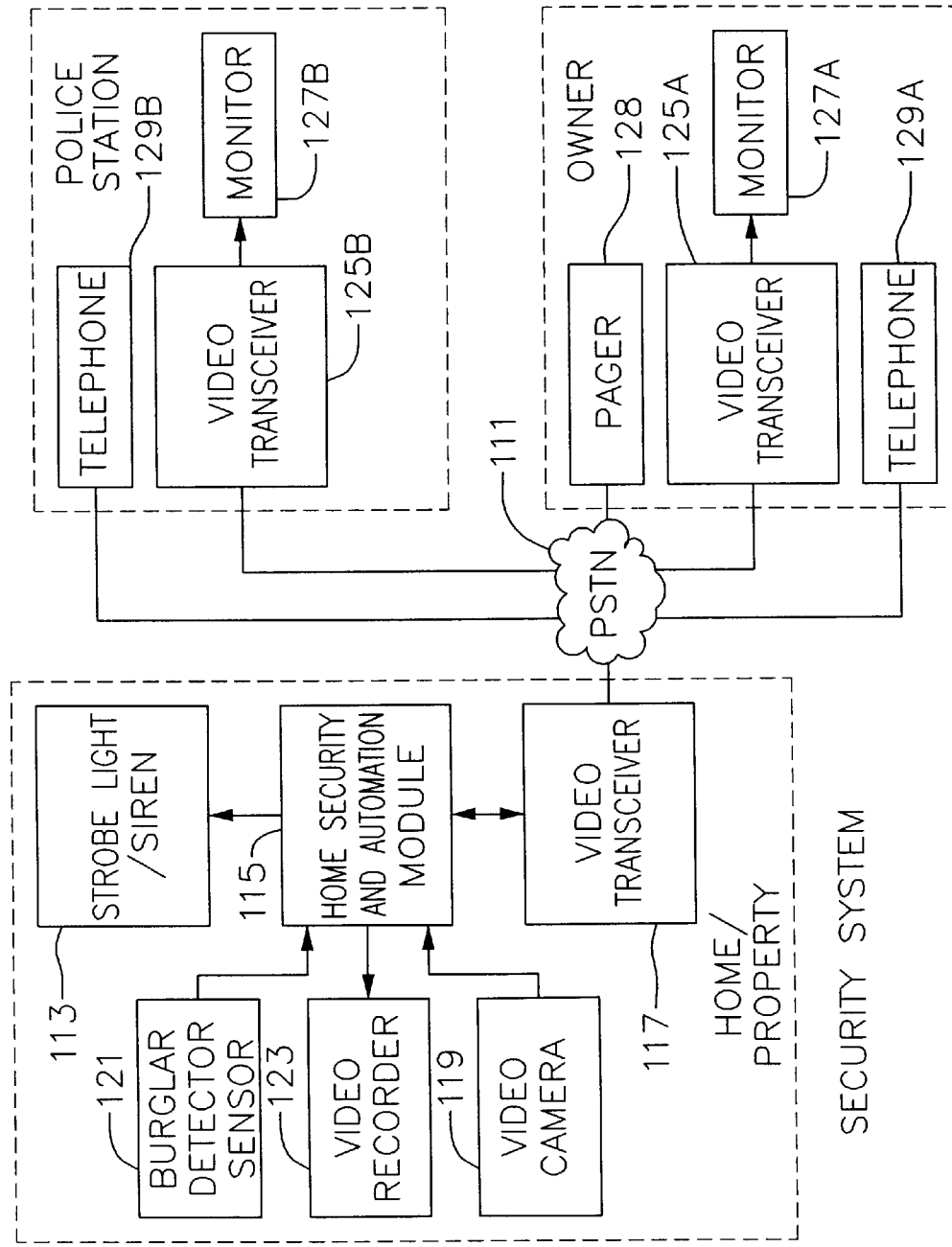
FIG. 8 is a security control system which uses a home security and automation module.

FIG. 8 illustrates one application of the video transceiver with the automation module in a security control system. A burglar detector sensor 121 is used to detect an intrusion into a home. The automation module 115 receives an input from the burglar detector sensor 121 and activates a strobe light/siren 113. At the same time, the automation module 115 monitors the surroundings with a video camera 119. The video camera output is coupled by the automation module 115 to a video recorder 123.

The burglar detection sensor output is coupled by the automation module to the video transceiver 117 which automatically dials one or more numbers to alert interested parties. A call can be made to a pager 128 to alert an owner of a home intrusion, or made to the owner's telephone 129A. The call can also be placed to the owner's video transceiver 125A to allow direct viewing by the owner through a television monitor 127A. If the owner is alerted over the telephone, the owner can use the video transceiver 125A to monitor his or her home or property with the television monitor 127A. If the owner is alerted over the video transceiver 125A, the owner can monitor his or her home or property with the television monitor 127A simply by entering a password.

In response to the burglar detection output, the video transceiver 117 can also be programmed to alert police by dialing the telephone number for the police department 129B or a video transceiver 125B used by the police department. Similar to the owner, the police can monitor a home or property being burglarized by using the video transceiver 125B and the television monitor 127B. In order to gain access to the video transceiver 117, the police also need to know the password.

The owner of the home or property and the police can access the video transceiver 117 and monitor a burglary in progress at the same time. Control over the automation system can be given either to the owner or the police through a request sent to the video transceiver 117 over the PSTN telephone line 111. Once access to the automation system is acquired by either the owner or the police, commands can be entered into the keypad of his or her respective video transceiver. By way of example, if the owner gains control of the automation system, the owner may need to select one zone to view if his or her television monitor 127A lacks split screen capability. In that case, the owner enters the appropriate command on the keypad of his or her video transceiver 125A. The command is sent over the PSTN telephone line to the video transceiver 117. The video transceiver causes the controller circuit in the automation module to multiplex the selected zone back to the transceiver for transmission over the PSTN telephone to the owner. Generally, once control is surrendered to one of the viewers, e.g., the owner, the other viewer merely becomes a passive viewer merely observing what is being transmitted over the PSTN telephone line.

Figure 9:
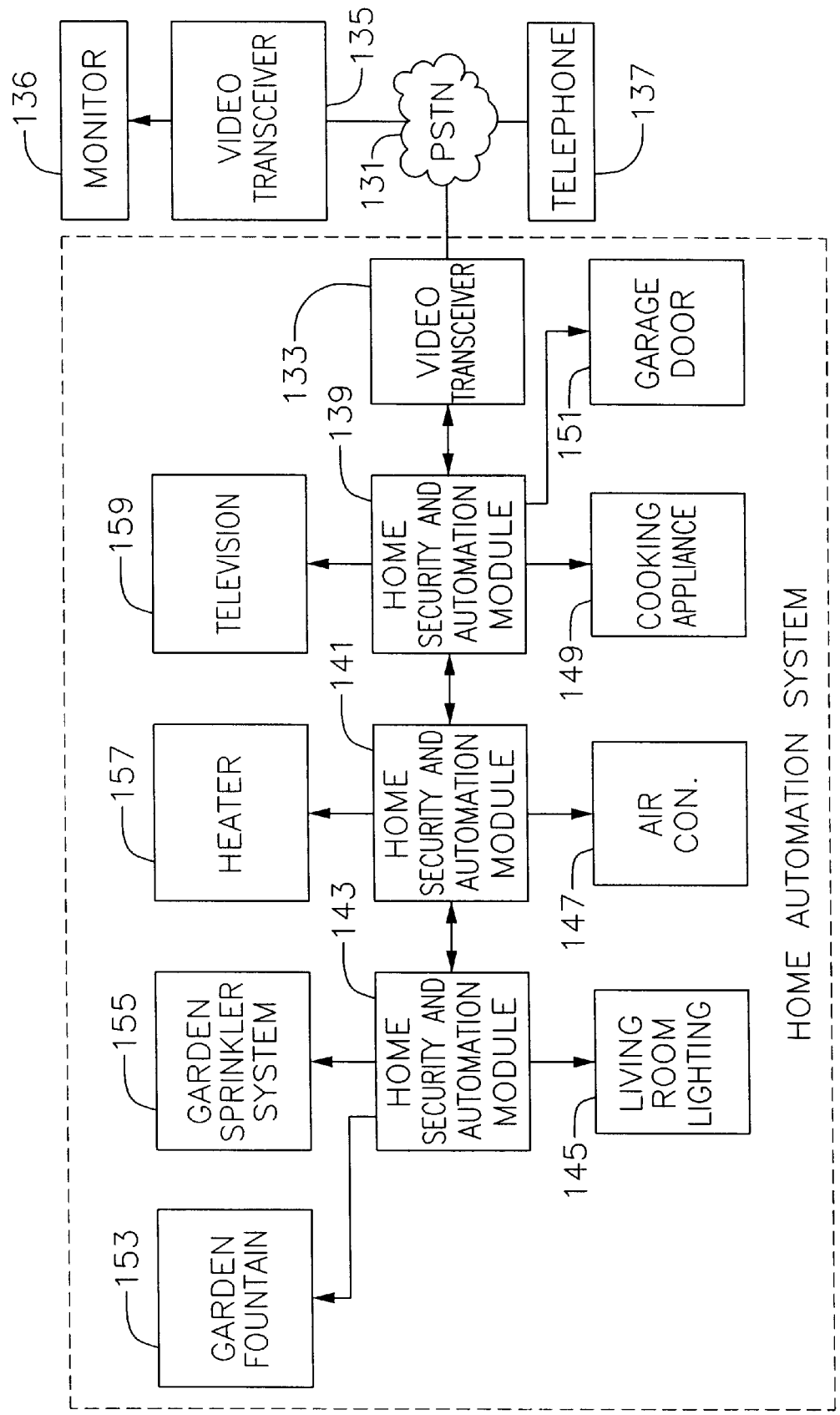
FIG. 9 is a home automation system which uses three home security and automation modules.

FIG. 9 illustrates another application of the video transceiver utilizing three automation modules 139, 141 and 143. A video transceiver 133 is coupled to a PSTN telephone line 131. A video transceiver 135 and a telephone 137 are also coupled to the PSTN telephone line 131.

As illustrated in FIG. 7 and described earlier, each automation module can control up to three zones. Since the automation module can control only one home automation appliance in each zone, each automation module can control up to three home automation appliances. By connecting three automation modules in series, nine home appliances can be controlled. In the described embodiment, the automation module 143 controls a living room light 145, a garden fountain 153 and a garden sprinkler system 155. The automation module 141 controls an air conditioning unit 147 and a heater 157. The automation module 139 controls a cooking appliance 149, a television 159 and a garage door 151.

The automation modules 139, 141 and 143 are controlled by a user over the PSTN telephone line 131 from the telephone 137 or the video transceiver 135. In order for the user to control various home automation appliances, the user must know a password to access the video transceiver 133. First, the user dials the number for the video transceiver 133 from the telephone 137 or the video transceiver 135. Then the user enters the password, and then controls the home automation appliances by sending control commands to the automation modules.

Figure 10:
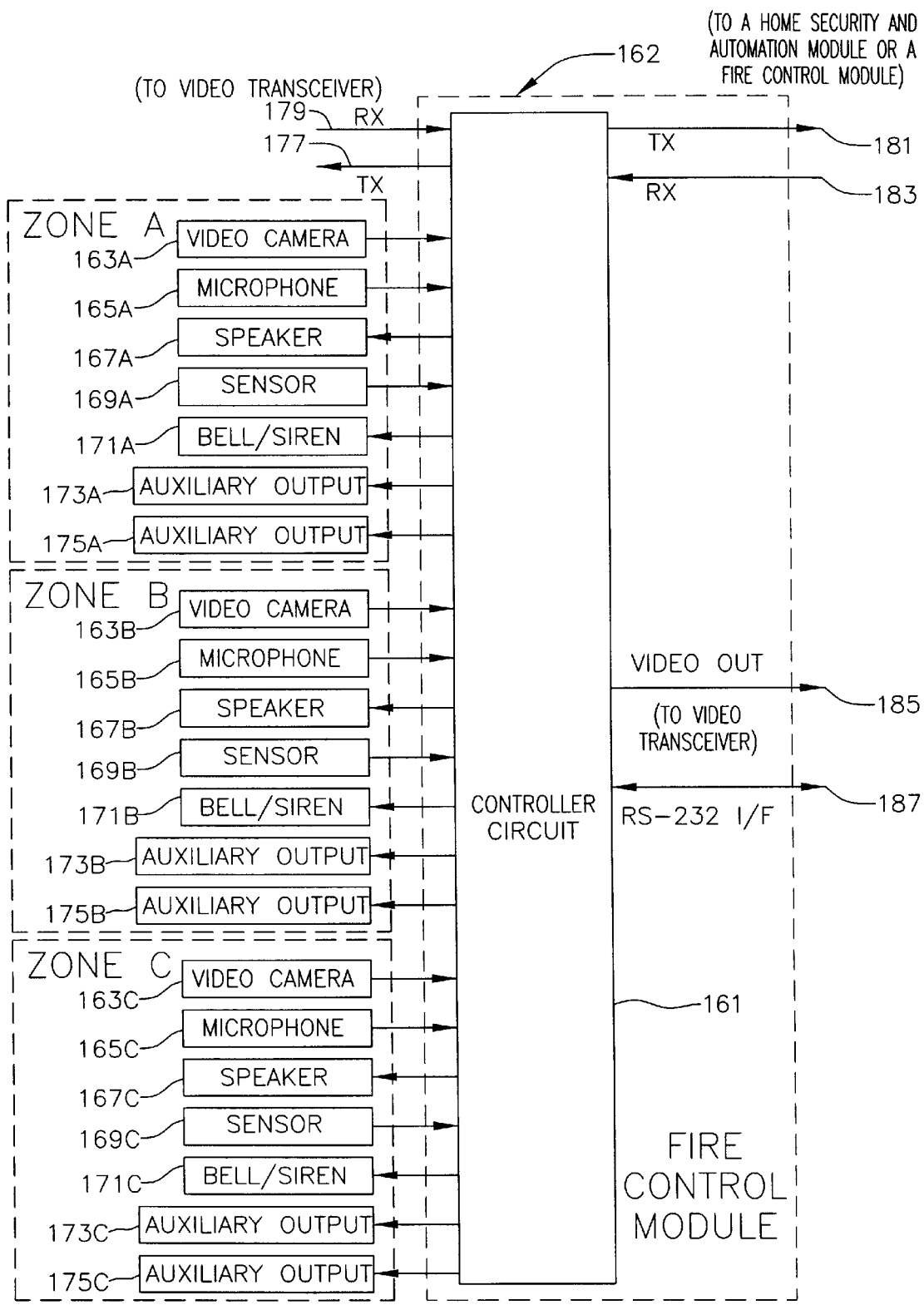
FIG. 10 is a simplified block diagram of a fire control module.
Figure 10A:
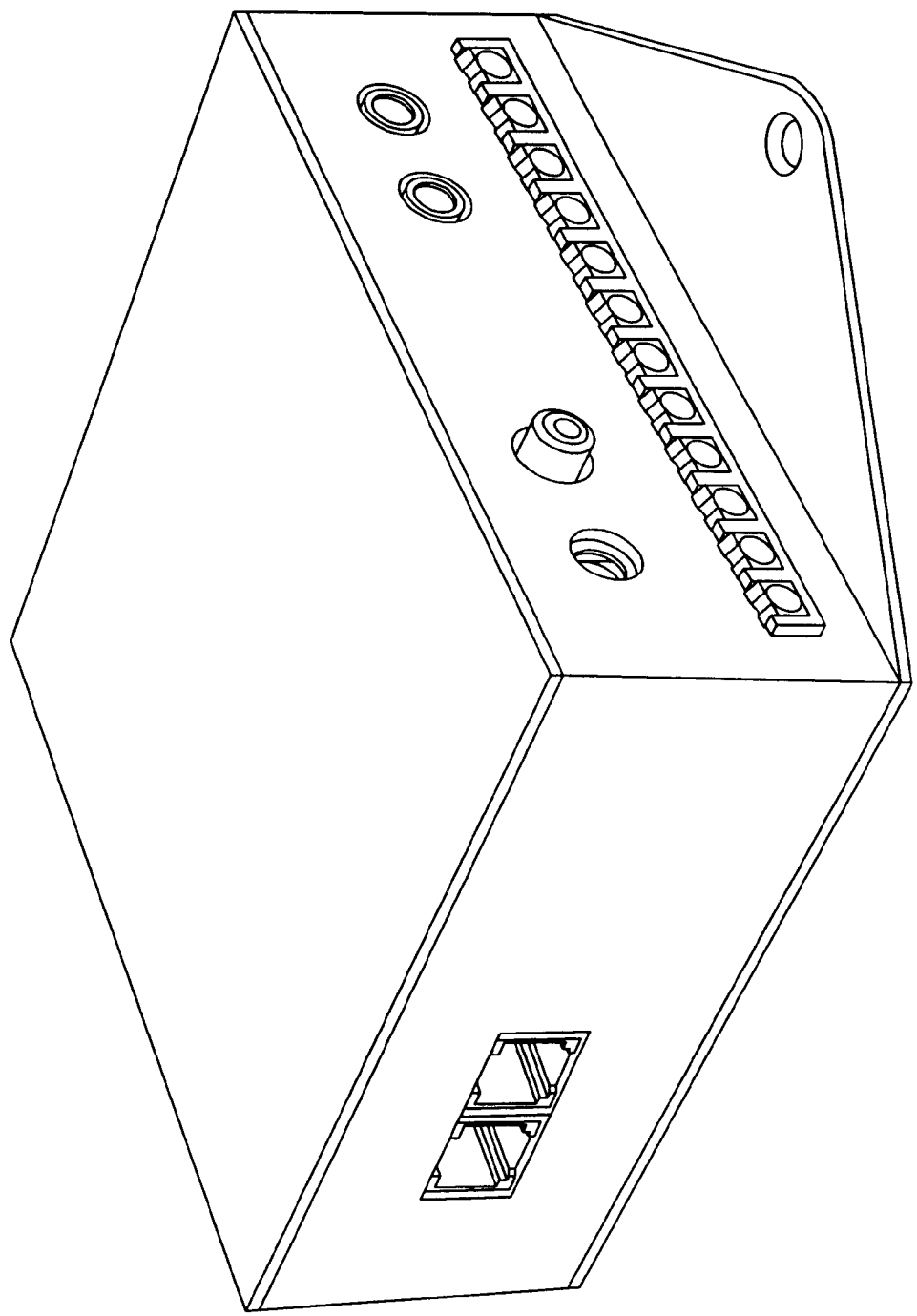
FIG. 10A is a typical packaging of a fire control module.

FIG. 10 illustrates another application of the video transceiver utilizing a fire control module 162. As shown in FIG. 10, the structure and signals of the fire control module is similar to the structure and signals of the automation module illustrated in FIG. 7. FIG. 10A is a typical packaging for the fire control module.

The fire control module includes a controller circuit 161 which has two pairs of dedicated transmit and receive lines 177, 179 and 181, 183 as well as a video signal output 185. The controller circuit 161 also has a capability for a bi-directional RS-232 interface 187 which can be used to re-program the automation module 162 from a computer.

The controller circuit 161 also has capabilities for connections to three video cameras 163A, 163B and 163C, three microphones 165A, 165B and 165C, three speakers 167A, 167B and 167C, three sensors 169A, 169B and 169C and three bells or sirens 171A, 171B and 171C. The controller circuit 161 also can be connected to up to six auxiliary devices with auxiliary outputs 173A–C and 175A–C. The connections for devices are organized into three zones A, B and C. The video camera 163A, the microphone 165A, the speaker 167A, the sensor 169A and the bell or siren 171A as well as auxiliary outputs 173A and 175A would be in the zone A. Similarly, other devices and outputs would be organized into zones B and C.

The transmit and receive lines 181, 183 are used to connect the fire control module 162 to another fire control module or an automation module. The other transmit and receive lines 177, 179 are for connection to the controller circuit 27 of the video transceiver (see FIG. 1). The controller circuit of the video transceiver manages the flow of video and audio out of the fire control module 162. By way of example, the controller circuit 161 includes a multiplexer (not shown) for multiplexing the video and audio from one of the zones in response to instructions from controller circuit 27 of the video transceiver. The controller circuit 161 is used to process inputs and outputs of the fire control module.

Figure 11:
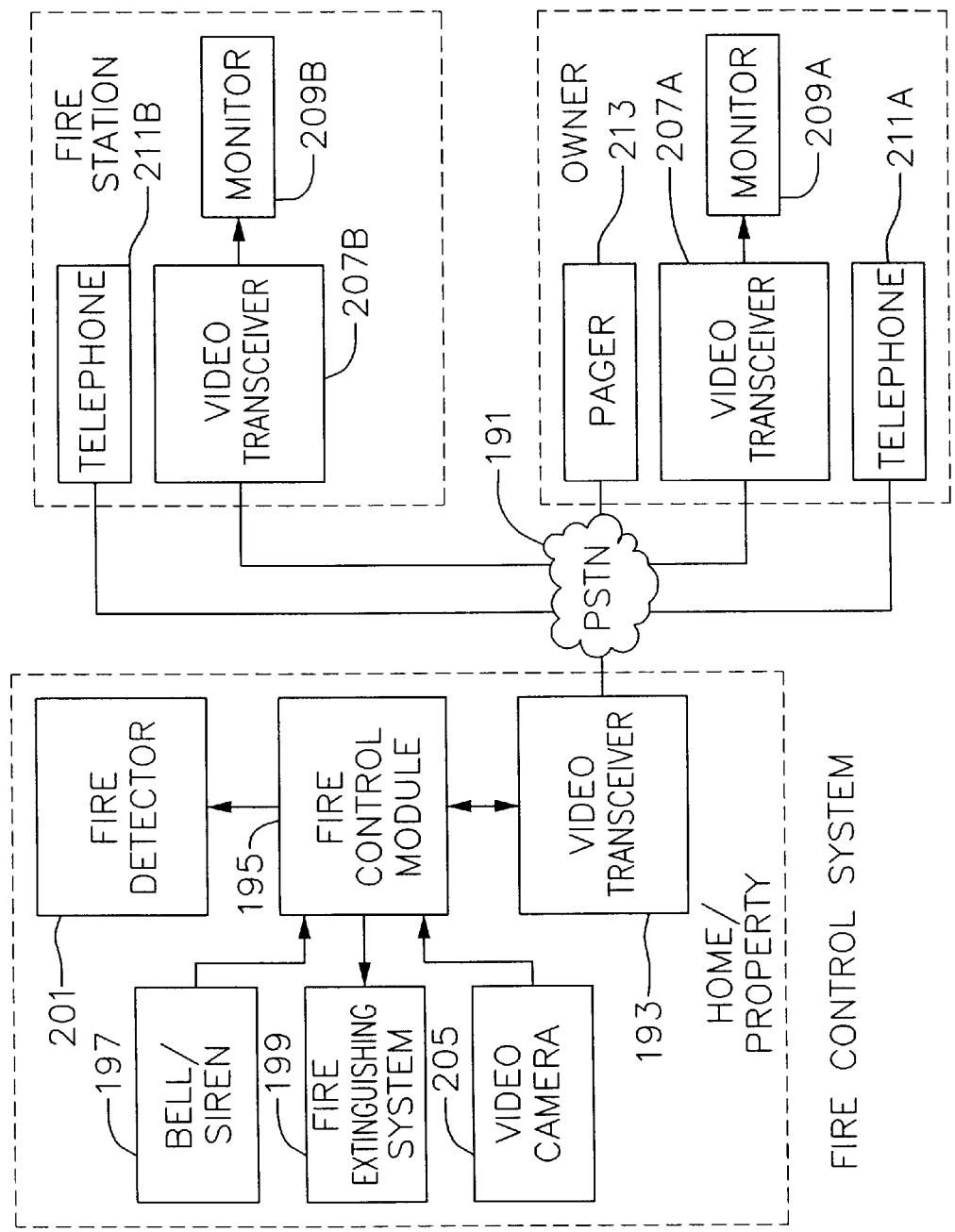
FIG. 11 is a fire control system with a fire control module.

FIG. 11 illustrates a fire control system with a fire control module 195 connected to a video transceiver 193. The video transceiver 193 is coupled to a PSTN telephone line 191.

In case of a fire, the fire is detected by a fire detector 201. The fire detector output is coupled to the fire control module 195 causing a bell or siren 197, as well as a fire extinguishing system 199, to activate. The fire detector output is coupled from the fire control module 195 to the video transceiver 193. In response, the video transceiver 193 automatically dials the owner of a home or property where the fire has occurred at a video transceiver 207A over the PSTN telephone line 191, a telephone 211A or a pager 213. The video transceiver 193 also dials the fire station to access a video transceiver 207B or a telephone 211B. The access and control of the transceiver 193 by either the owner or the fire station is similar to the case of the security system based on an automation module as described above.

Figure 12:
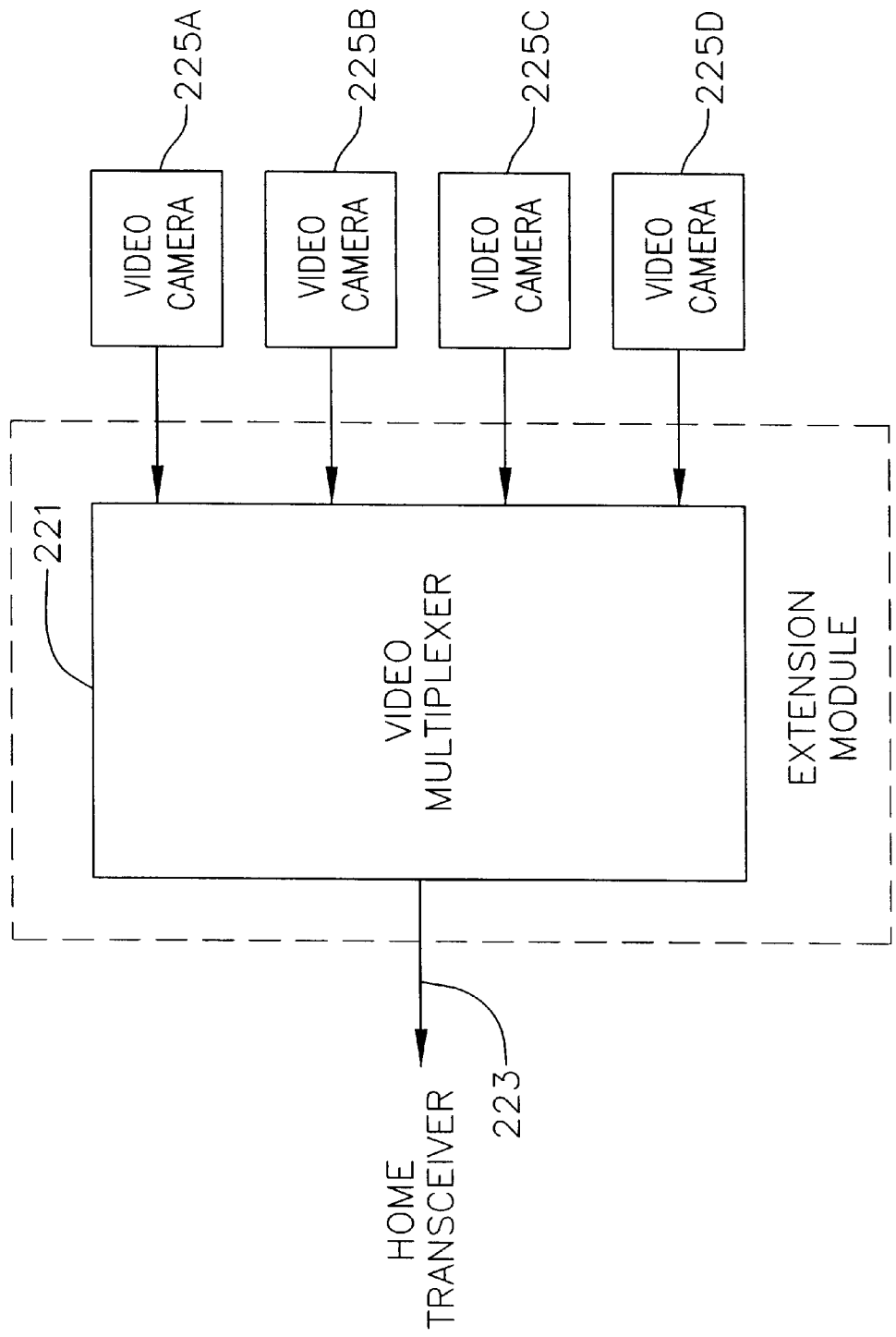
FIG. 12 is a block diagram of an extension module.

In an alternative embodiment of the present invention, an extension module is used to provide video camera expansion capability for the video transceiver. FIG. 12 illustrates a block diagram of an exemplary extension module. A video multiplexor 221 is used in the extension module to multiplex video signal inputs from video cameras. Four video cameras 225A–D provide the video signal inputs to the video multiplexer. Of course, those skilled in the art will appreciate that the actual number of video camera used can vary. A video signal output is generated by the video multiplexer of the extension module. The video extension module is connected to the video converter 35 of the audio/video circuit 23 of the video transceiver (See FIG. 5).

Figure 13:
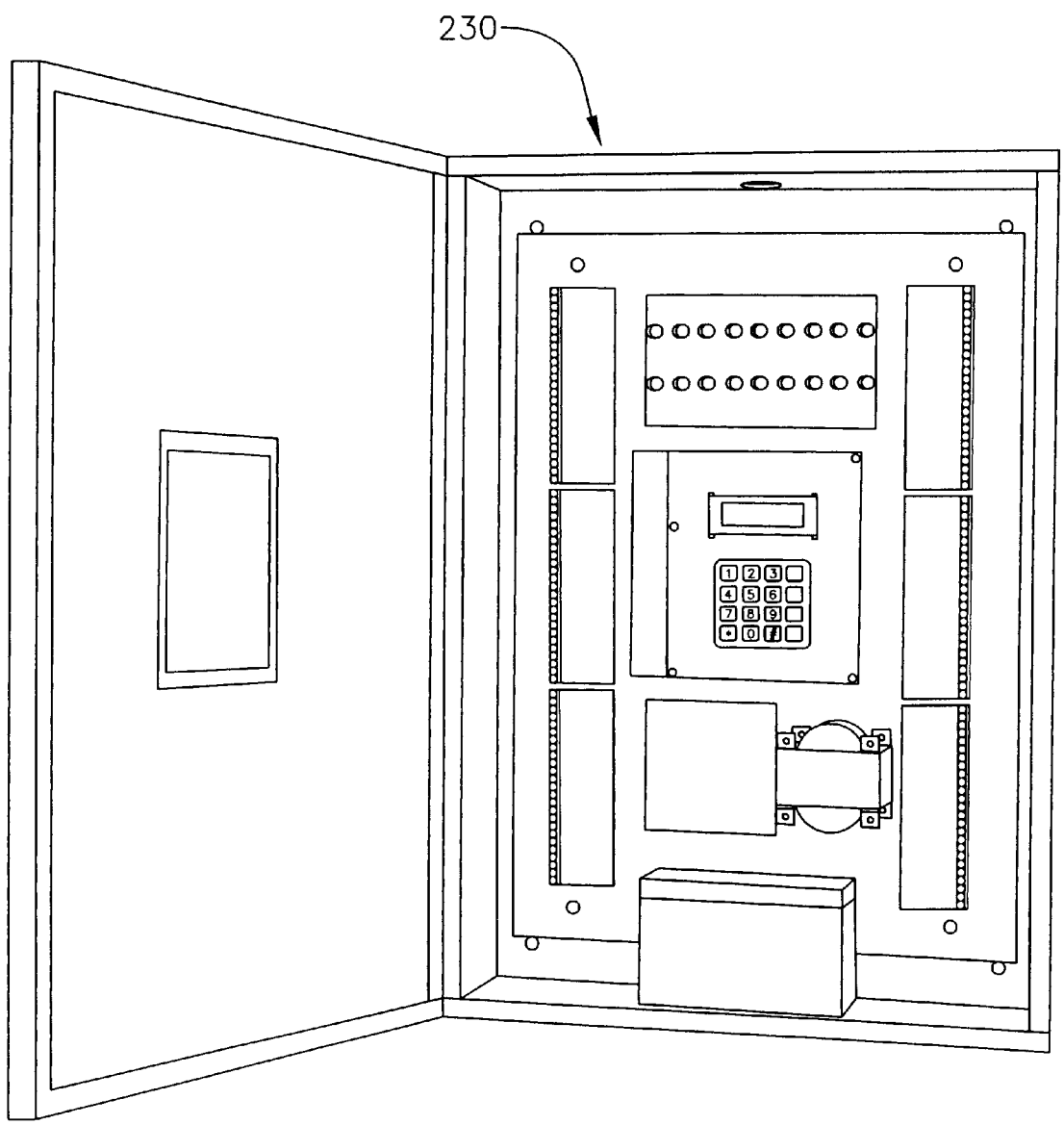
FIG. 13 is a preferred packaging of a multiplex video transceiver.

Another embodiment of the present invention is a video transceiver that can be controlled from remote locations with external keypad controllers. FIG. 13 is a preferred packaging of a multiplex video transceiver which is capable of being controlled from remote locations.

Turning to FIG. 14, an alternative embodiment of the present invention is shown using a multiplex video transceiver. The multiplex video transceiver includes a transceiver circuit 240 comprising an audio/video circuit 243 coupled to a controller circuit 231. The controller circuit 231 is responsible for managing all operations of the multiplex video transceiver and coordinating the flow of data into and out of the system. The audio/video circuit 243 accepts commands from the controller 231 formats the data for transmission on a PSTN telephone line.

The multiplex video transceiver also includes a number of interface circuits. A video multiplexer circuit 233 provides a video camera interface to the controller circuit 231 of the transceiver circuit 240. The video multiplexer 233 receives a number of video camera inputs and provides a single video signal input to the controller circuit 231. A number of I/O circuits 235 A–F provide an audio interface, as well as other peripheral interfaces, to the controller circuit 231 of the transceiver circuit 240. More particularly, each I/O circuit provides an interface between a two way audio communication line, a sensor input and an alarm output. In the described embodiment, the controller circuit 231 communicates with six I/O circuits, but the number of I/O circuits can vary.

The multiplex video transceiver also includes a keypad circuit 245 which provides a user interface to the transceiver circuit 240. An LCD display 247 is connected to the keypad circuit 245. The LCD display is used to display status messages. In particular, when a system check is run, results of the system check are displayed on the LCD display. In addition, the multiplex video transceiver has a capability for video in/out and keypad in/out interfaces for communicating with one keypad controller at a time. The keypad in/out interface includes an audio in/out interface.

A power circuit 237 is connected to the controller circuit 231. The power circuit includes an AC/DC converter which allows DC power to be applied to the multiplex video transceiver by a conventional AC power outlet. A DC battery 241 is connected in parallel to the output of the AC/DC converter 239 to maintain power in the event of an AC power failure. The power circuit 237 is also connected to a number of exterior connectors. As a result, peripheral devices such as video cameras can be simply plugged into the multiplex video transceiver to operate without an independent power source.

The audio/video circuit 243 is identical to the audio/video circuit of the home or portable video transceiver (see FIG. 5). However, the interface between the controller circuit 231 and the audio/video circuit 243 is slightly different. In the multiplex video transceiver, all audio/video circuit 243 inputs and outputs are routed through the controller circuit 243. This is more a matter of convenience and one skilled in the art will readily appreciate that the inputs and outputs of the audio/video circuit 243 could be coupled directly to the video sources, audio sources and the PSTN telephone line as described with respect to the home or portable video transceiver of FIG. 5. By way of example, the controller circuit 231 provides a convenient mount for a telephone jack (not shown) for transmitting and receiving modem signals over a PSTN telephone line is connected to the controller circuit 231. Consequently, the output of the modem processor circuit 41 (See FIG. 5) is routed through the controller circuit 231.

Figure 14A:
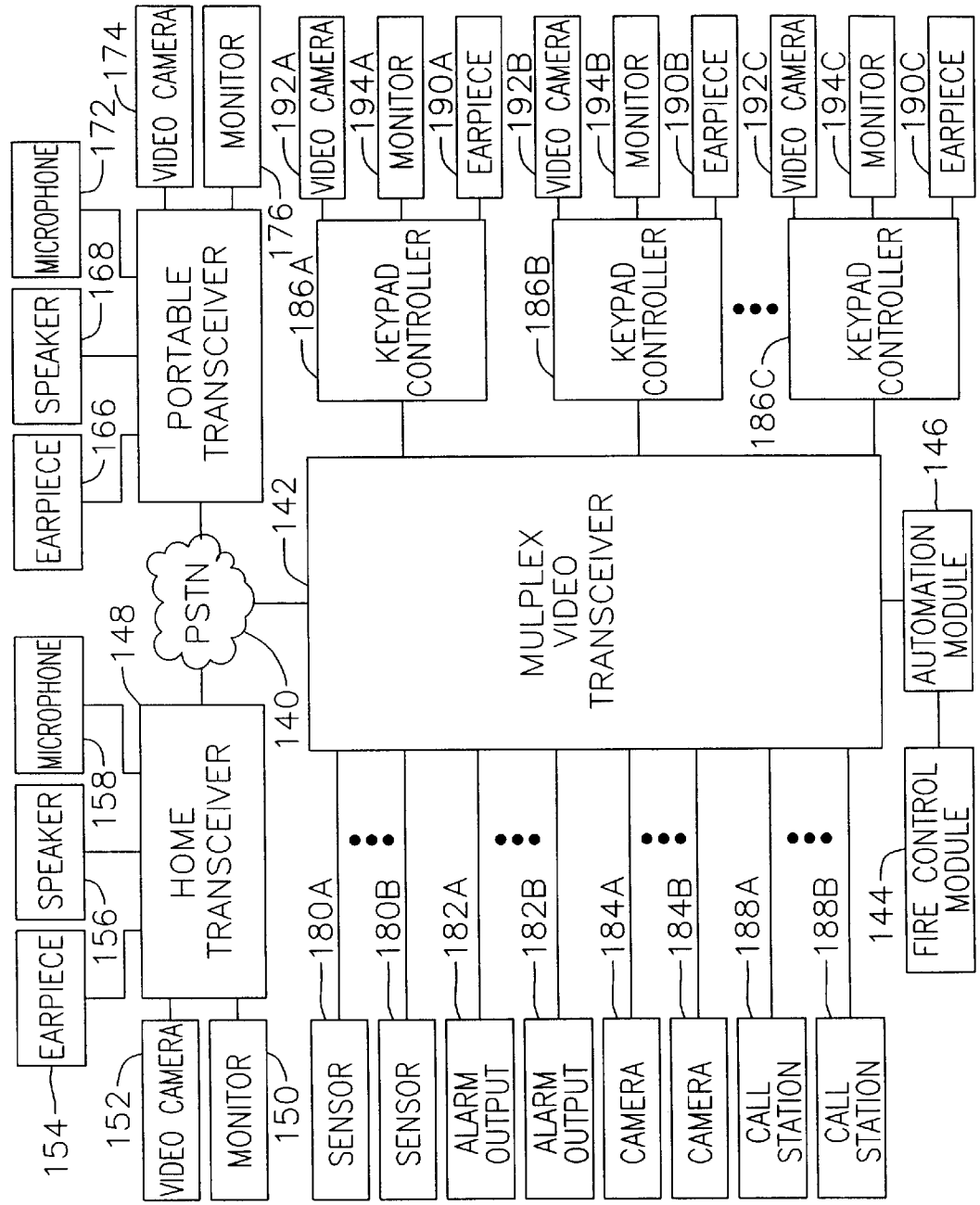
FIG. 14A is a video conferencing system using multiple video transceivers including one multiplex video transceiver.

FIG. 14A is a video telephone conferencing system using one home transceiver 148, one portable transceiver 178, and one multiplex video transceiver 142. The video transceivers 142, 148 and 172 are coupled to each other over a PSTN 140. The home transceiver 148 and the portable transceiver 178 receive video camera outputs from video cameras 152 and 174, respectively, and displays to monitors 150 and 176, respectively. For the home and portable transceivers, audio communications are carried out through speakers 156, 168 and microphones 158, 172, respectively, or through earpieces 154 and 166, respectively, for hands-free operation.

A fire control module 144 and an automation module 146 provide additional capabilities for fire control and home automation/security system, respectively, to the multiplex video transceiver 142. However, the fire control module and the automation module can extend capabilities of the home transceiver 148 or the portable transceiver 178 as well.

The multiplex video transceiver is also connected to multiple input and output devices including sensors 180A–B, alarms 182A–B, video cameras 184A–B and call stations 188A–B. Even though two devices of each type are shown as example in FIG. 14A, the multiplex video transceiver has capabilities for handling many more input and output devices.

In a preferred embodiment of the present invention, the multiplex video transceiver can be connected to up to six keypad controllers simultaneously. In FIG. 14A, the multiplex video transceiver is connected to three keypad controllers 186A–C. From each of the remote locations associated with each keypad controller, audiovisual communication can be established with either the home transceiver or the portable transceiver through the multiplex video transceiver over the PSTN 140.

The three keypad controllers 186A–C receives video camera inputs from video cameras 192A–C, respectively, displays video signal outputs on monitors 194A–C, respectively, and establish bi-directional audio communications using earpieces 190A–C, respectively. Of course, the audio communications can be established using separate speakers and microphones instead of using the earpieces.

In a system with more than two video transceivers coupled together over a PSTN as shown in FIG. 14A, a two-way audiovisual communication can be established between any two video transceivers. In addition, a three-way or a multi-way audiovisual communications can be established as well in a similar manner as a three-way or a multi-way telephone communications.

Figure 15:
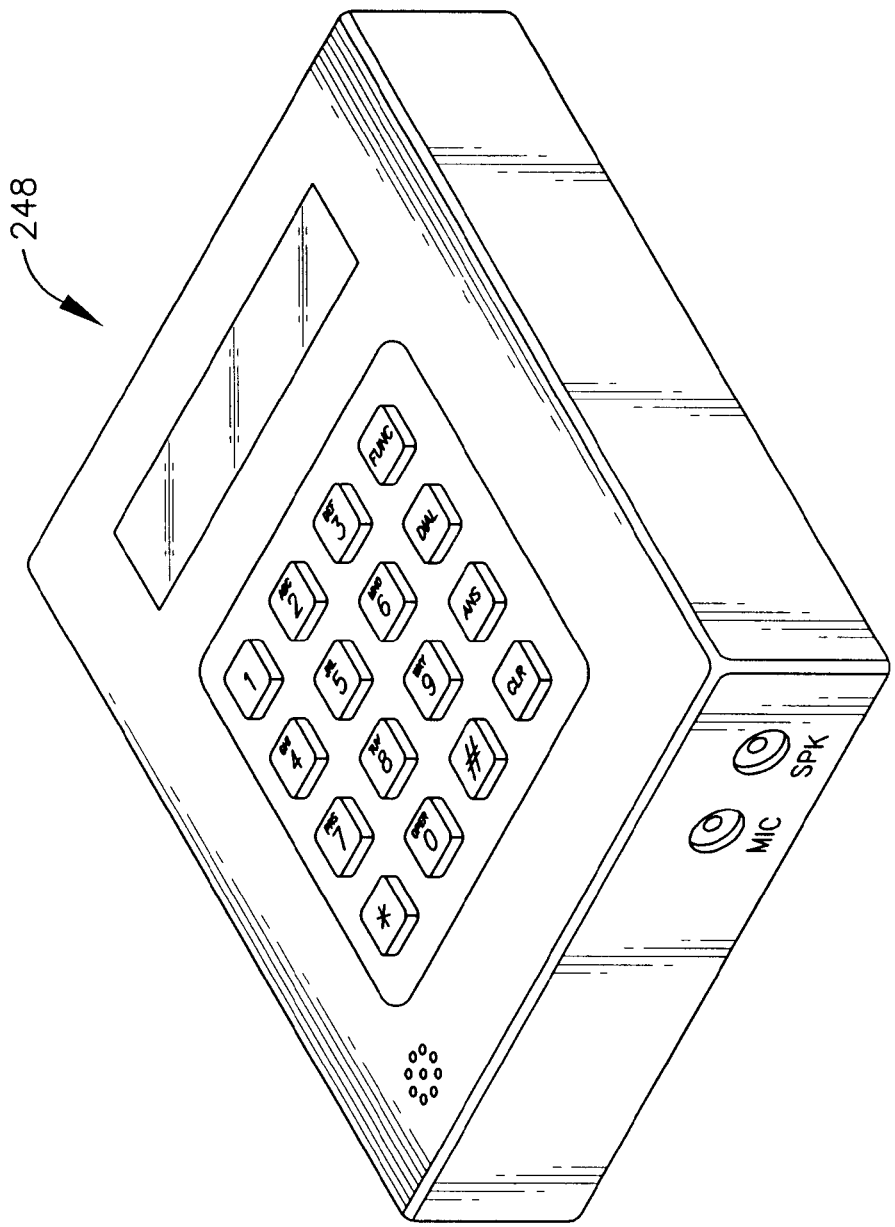
FIG. 15 is a preferred packaging of a keypad controller.
Figure 16:
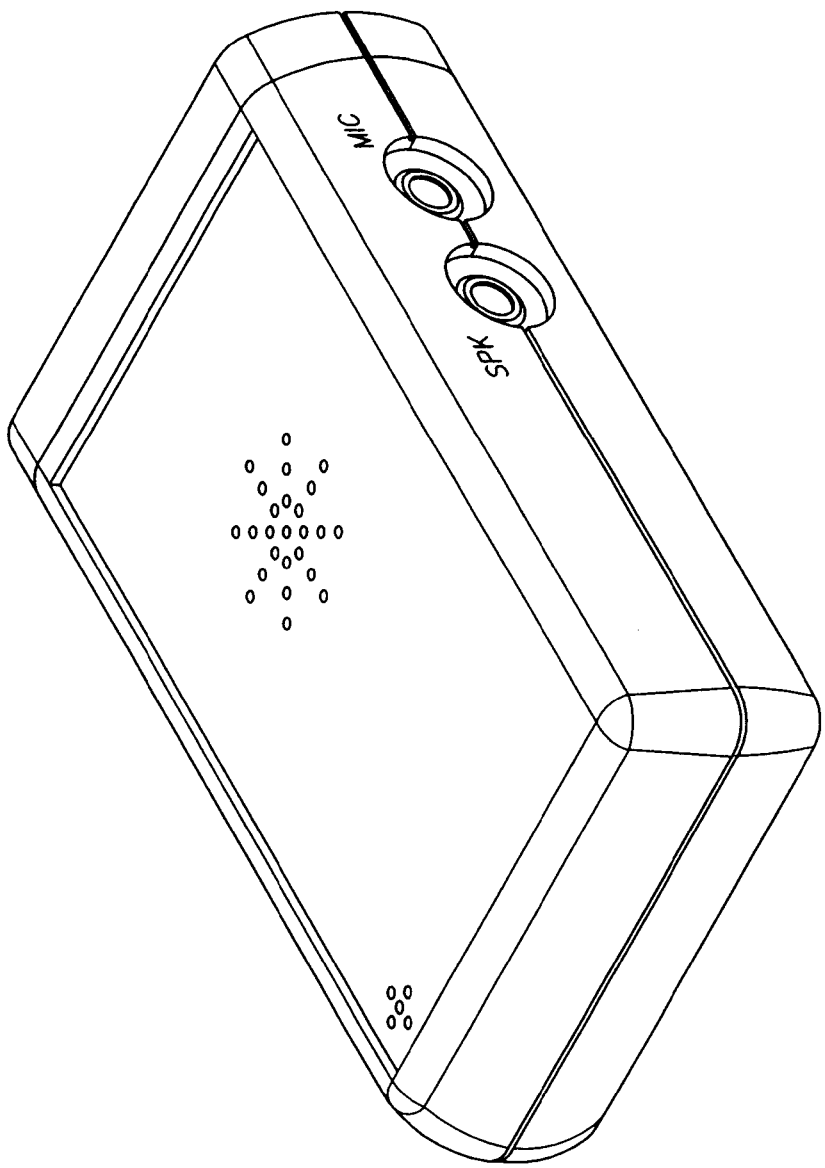
FIG. 16 is a preferred packaging of a call station.

FIG. 15 is a preferred packaging of the keypad controller which includes a keypad and an LCD display similar to the keypad on the multiplex video transceiver. In the preferred packaging, the keypad is a membrane keypad rather than a face plate with individual keys. A preferred packaging of the call box is illustrated in FIG. 16. The call box operates as a microphone and a speaker.

Figure 17:
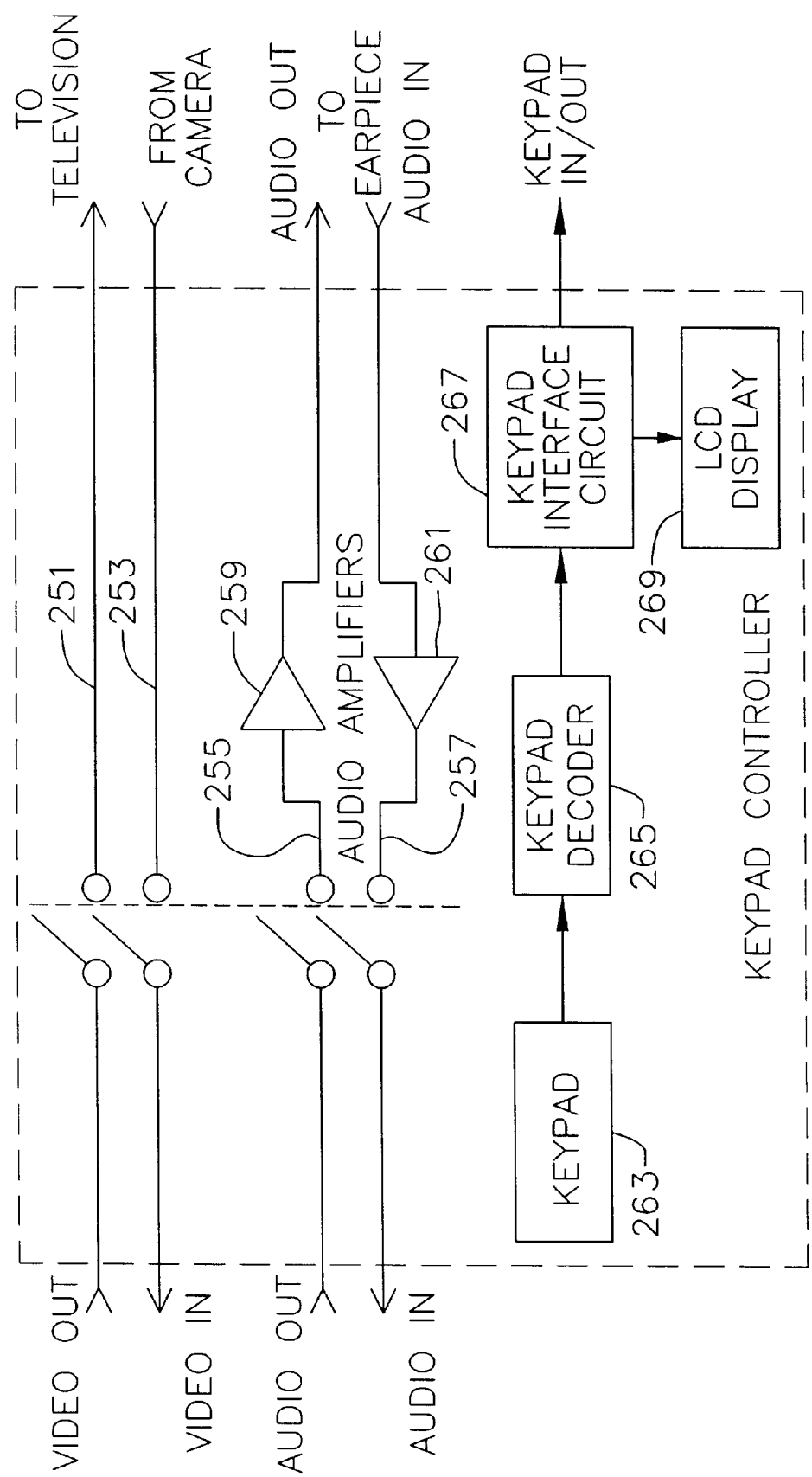
FIG. 17 is a system block diagram of a keypad controller.

FIG. 17 is a system block diagram of a keypad controller. A video signal output from the keypad controller goes to a television while a video signal input from a video camera is received by the keypad controller and transmitted to the multiplex video transceiver. As shown in FIG. 17, video lines 251 and 253 are connected and interrupted using relays. For example, if the relay in the video line 251 is open, the television connected to the video line 251 does not receive any signals to display. Similarly, if the relay in the video line 253 is open, no video signal input from the connected video camera cen be passed onto the multiplex video transceiver.

Similar to the video lines, audio lines 255 and 257 can be opened or closed based on on/off status of relays. An audio output signal from the multiplex video transceiver passes through the relay in the audio line 255, is amplified by an audio amplifier 259, and transmitted to an earpiece. An audio input signal from the earpiece is amplified by an audio amplifier 261 and passes through the relay in the audio line 257, and then transmitted to the multiplex video transceiver. The audio lines 255 and 257 establish audio communications between the multiplex video transceiver and respective one of the remote control keypad controllers.

A keypad 263 of the keypad controller is used for entering user inputs which are provided to a keypad decoder 265. A keypad decoder 265 decodes user inputs made up of a series of alphanumeric and other keys. The decoded user inputs are transmitted to the multiplex video transceiver using a keypad interface circuit 267. In addition to driving the interface with the multiplex video transceiver, the keypad interface circuit drives an LCD display 269. Over the keypad in/out interface, the keypad controller remotely controls the multiplex video transceiver. The LCD display informs the user of the status of interface.

Figure 18:
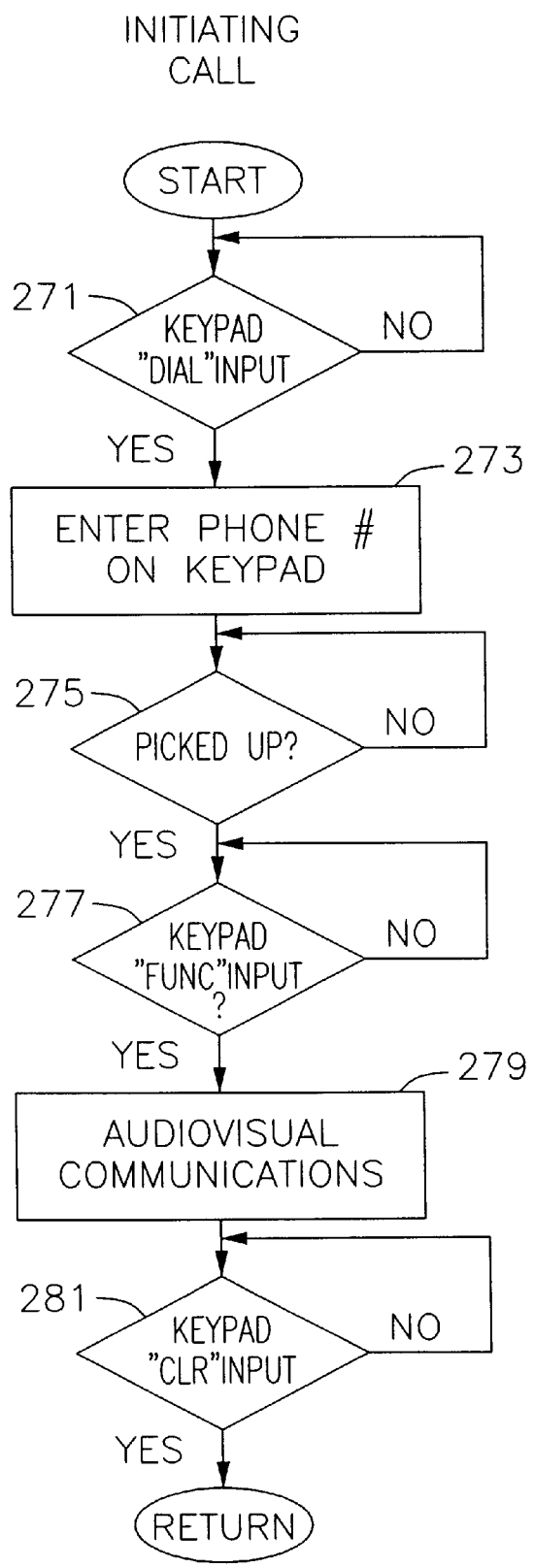
FIG. 18 is a flow diagram of initiating a call using a video transceiver.

FIG. 18 is a flow diagram of how a caller initiates audiovisual communications with the video transceiver system over the PSTN. The caller presses the DIAL key on the keypad as shown in step 271. Then the caller enters the phone number of the video transceiver to be accessed as shown in step 273.

When the call is picked up by a user on the other side as shown in step 275, i.e., the user presses the ANS key on his video transceiver, the caller and the user can start video conferencing immediately. In one embodiment of the present invention, once the call is picked up, the user and the caller need to press their respective FUNC keys within 3 second of each other as shown in step 277. Any time during video conferencing in step 279, either side can hang up by pressing the CLR key on his or her respective keypad.

Figure 19:
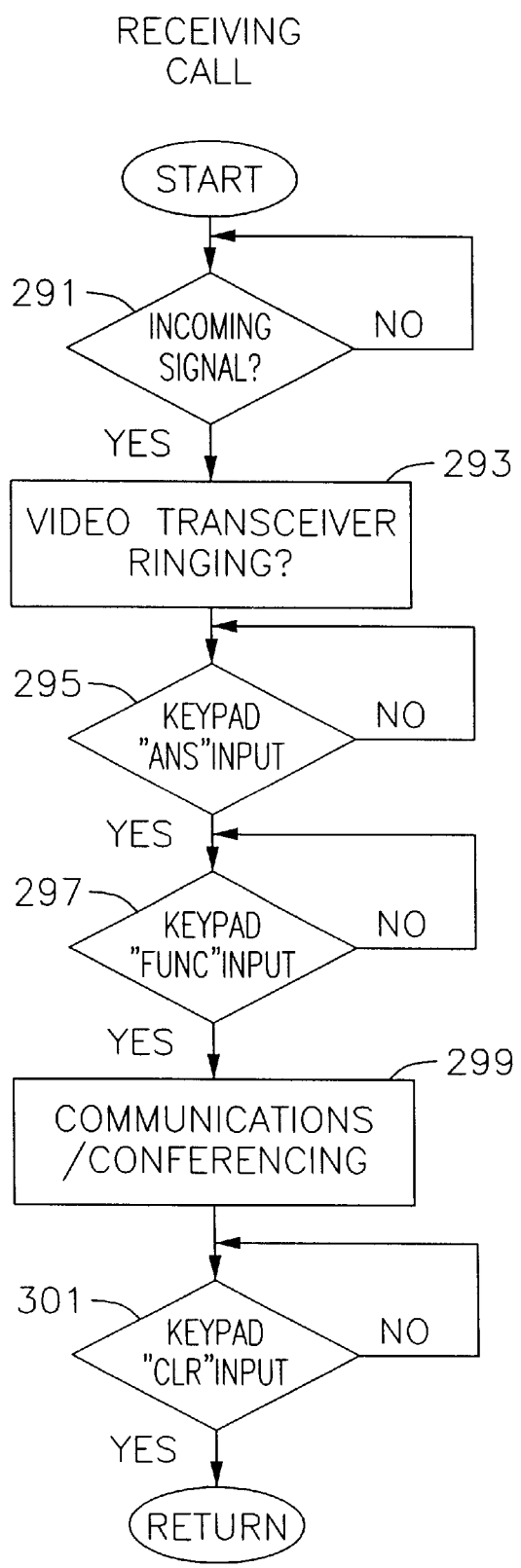
FIG. 19 is a flow diagram of receiving a call using a video transceiver.

FIG. 19 is a flow diagram indicating how a call to the video transceiver over the PSTN is received. As a caller with a first video transceiver dials the number of a second video transceiver, when the incoming signal is received as shown in step 291, a user on the side of the second video transceiver is alerted by a ringing sound similar to a telephone ringing as shown in step 293. The video transceiver then waits for the ANS key to be pressed by a user as shown in step 295.

Once the ANS key is pressed, the video transceiver waits for the FUNC key to be pressed by both the caller and the user. In one embodiment of the present invention, the FUNC keys on the user's video transceiver and the caller's video transceiver are pressed almost simultaneously, i.e., within three seconds of each other as shown in step 297. In another embodiment of the present invention, a call is automatically answered if unanswered after a predetermined number of rings. In this case, the caller needs to enter a password to start audiovisual communications with the video transceiver at the user's end.

Step 299 shows video conferencing between the second video transceiver and the first video transceiver. The communication can be for any of remote video surveillance, security system monitoring, closed circuit (CCTV) viewing, fire control monitoring or home automation applications. Once again, either side can hang up by pressing the CLR key on his or her respective keypad as indicated in step 301.

Figure 20:
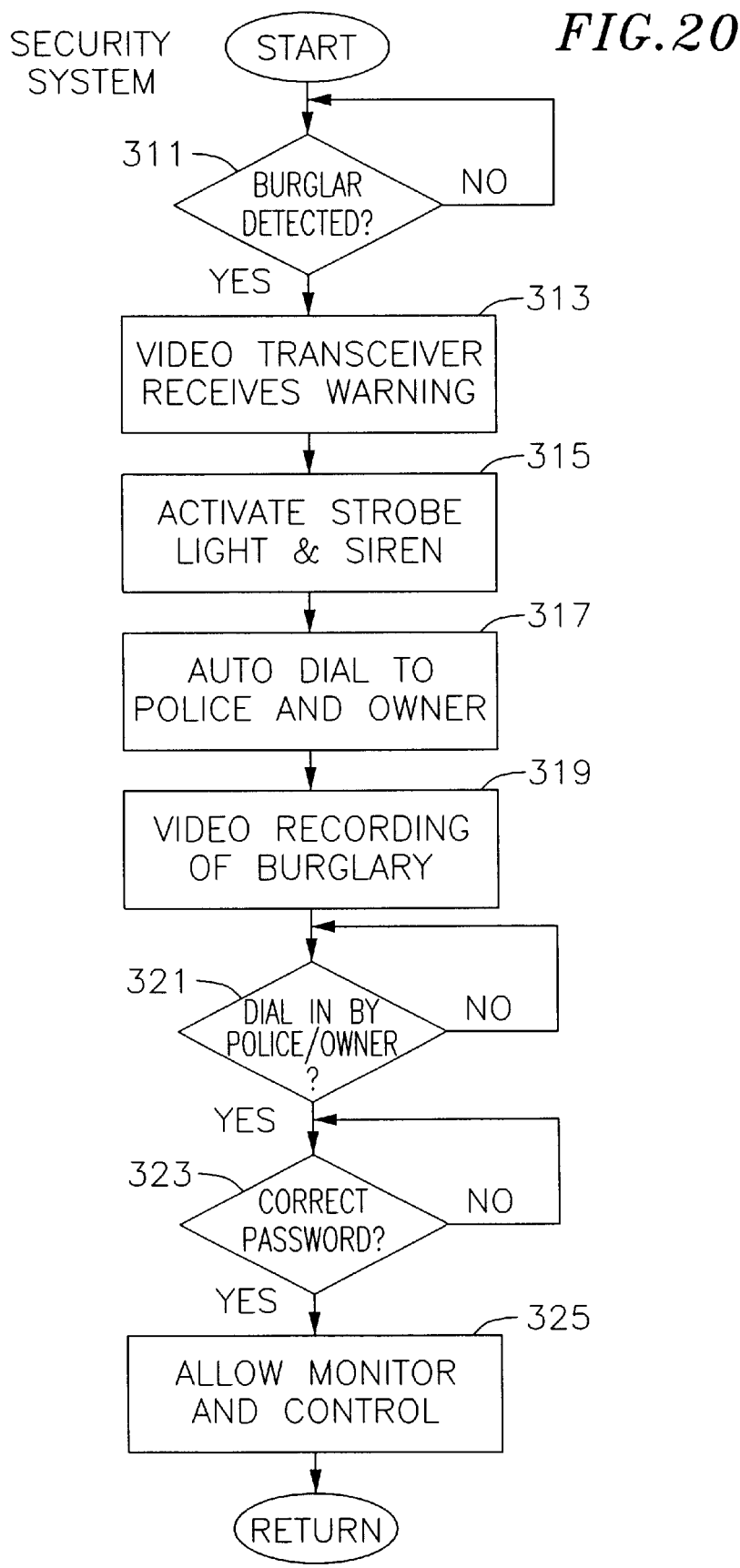
FIG. 20 is a flow diagram of a security system.

FIG. 20 is a flow diagram of a an exemplary operation of a security system which includes a video transceiver and a home security and automation module. Upon breaking in, a burglar is detected by a burglar detector sensor as shown in step 311, and the video transceiver receives warning per step 313. The video transceiver commands the home security and automation module to activate strobe light and siren, and the home security and automation module activates them as indicated in step 315.

Meanwhile, the video transceiver automatically calls and informs the police and the property owner of the intrusion as indicated in step 317. At the same time, the burglary is video taped as shown in FIG. 319. The police or the property owner can call the video transceiver from another video transceiver and monitor and control the security system if they enter the correct password upon calling as indicated in steps 321, 323 and 325.

Figure 21:
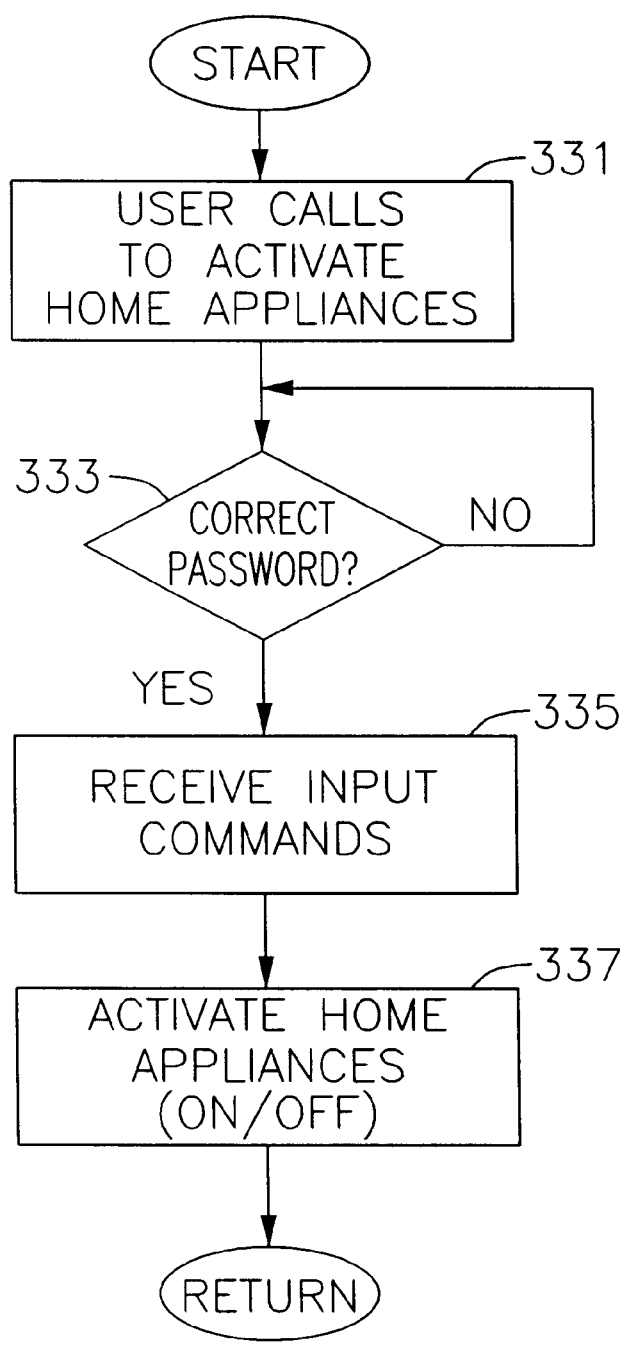
FIG. 21 is a flow diagram of a home automation system.

FIG. 21 is a flow diagram of an exemplary operation of a home automation system. To activate the home automation system, the user calls with a phone or a video transceiver as indicated in step 331. The home automation system checks for the input of a correct password as shown in step 333. Then the user enters commands and the video transceiver receives them to turn home appliances on or off as shown in steps 335 and 337.

FIG. 22 is a flow diagram of an exemplary operation of a fire control system using a fire control module and a video transceiver. The operation of the fire control system is similar to the operation of the security system illustrated in FIG. 20. Steps 341, 343, 345, 347, 349, 351, 353 and 355 are similar to corresponding steps for the security system. A difference is that the fire control module detects fire with a fire detector sensor rather than burglary.

Accordingly, the present invention provides a remote surveillance and conferencing system for applications in the CCTV system, security systems, video conferencing, remote video surveillance, fire control and home automation. Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents rather than the foregoing description.

What is claimed is:

1. A video telephone line system, comprising:

a PSTN telephone line;

a video transceiver coupled to the PSTN telephone line, said video transceiver being capable of performing each of video conferencing, remote video surveillance, security system monitoring, closed circuit television (CCTV), fire control and home automation; and a security module coupled to the video transceiver, said security module being capable of receiving security information, providing the security information to the video transceiver, and generating a security signal in response to the security information, wherein the video transceiver is capable of providing the security information over the PSTN telephone line, and wherein the video transceiver can be monitored or controlled from any location with an access to the PSTN, and the video transceiver is capable of requiring a password to be provided by a user of another video transceiver prior to allowing said another video transceiver to monitor or control the video transceiver over the PSTN telephone line.

2. The video telephone line system of claim 1, further comprising a burglar detector sensor coupled to the security module, and the security information comprises an output of the burglar detector sensor, wherein the sensor output is generated in response to an intrusion of premises being monitored.

3. The video telephone line system of claim 1, further comprising a video camera and a video recorder coupled to the security module, and the security information comprises a video signal from the video camera, wherein the security module provides the video signal to the video recorder for recording a burglary in progress.

4. The video telephone line system of claim 1, further comprising a burglary alerting device coupled to the security module, wherein the burglary alerting device is activated in response to the security signal.

5. The video telephone line system of claim 4, wherein the burglary alerting device is selected from a group consisting of a strobe light and a siren.

6. The video telephone line system of claim 4, further comprising a fire control module coupled to the video transceiver, said fire control module being capable of receiving fire detection information, providing the fire detection information to the video transceiver, and generating a fire control signal in response to the fire detection information, wherein the video transceiver is capable of providing the fire detection information over the PSTN telephone line.

7. The video telephone line system of claim 6, further comprising a fire detector coupled to the fire control module, and the fire detection information comprises an output of the fire detector, wherein the detector output is generated in response to an occurrence of fire.

8. The video telephone line system of claim 6, further comprising a video camera coupled to the fire control module, and the fire detection information comprises a video signal from the video camera.

9. The video telephone line system of claim 6, further comprising a fire alerting device coupled to the fire control module, wherein the fire alerting device is activated in response to the fire control signal.

10. The video telephone line system of claim 9, wherein the fire alerting device is selected from a group consisting of a bell and a siren.

11. The video telephone line system of claim 6, further comprising a fire extinguishing system coupled to the fire control module, wherein said fire extinguishing system is activated in response to the fire control signal.

12. The video telephone line system of claim 6, further comprising a fire extinguishing system coupled to the fire control module, wherein said fire extinguishing system is activated in response to an activation signal received over the PSTN telephone line.

13. The video telephone line system of claim 6, further comprising a second video transceiver coupled to the PSTN telephone line, wherein the video transceiver automatically dials the second video transceiver in response to at least one of the security signal and the fire control signal.

14. The video telephone line system of claim 13, wherein each of the security information and the fire detection information comprises a video signal, and the video transceiver transmits the video signal to the second video transceiver for viewing by a user of the second video transceiver.

15. The video telephone line system of claim 13, wherein a user of the second video transceiver is capable of conducting a video conference with a user of the video transceiver.

16. The video telephone line system of claim 13, further comprising an appliance coupled to the video transceiver, wherein the video transceiver is capable of extracting an appliance control signal from the PSTN telephone line, said appliance being responsive to the extracted application control signal.

17. The video telephone line system of claim 16, wherein said appliance is selected from a group consisting of lighting, air conditioning, a cooking appliance, a garage door, a fountain, a sprinkler system, a heater and a television.

18. The video telephone line system of claim 16, wherein a user of the second video transceiver is capable of transmitting the appliance control signal to the video transceiver to control the appliance.

19. The video telephone line system of claim 1, wherein the video transceiver is capable of providing the security information over the PSTN telephone line concurrently to a first video transceiver through a first PSTN connection and a second video transceiver through a second PSTN connection, wherein one of the first and second video transceivers can monitor and control the video transceiver while the other one of the first and second video transceivers only monitors the video transceiver.

20. A video telephone line system, comprising:
a PSTN telephone line;
a video transceiver coupled to the PSTN telephone line, said video transceiver being capable of performing each of video conferencing, remote video surveillance, security system monitoring, closed circuit television (CCTV), fire control and home automation; and
a security module coupled to the video transceiver, said security module being capable of receiving security information, providing the security information to the video transceiver, and generating a plurality of security signals in response to the security information, each security signal corresponding to one of a plurality of zones,
wherein the video transceiver is capable of providing the security information over the PSTN telephone line, and
wherein the video transceiver can be monitored or controlled from any location with an access to the PSTN, and the video transceiver is capable of requiring a password to be provided by a user of another video transceiver prior to allowing said another video transceiver to monitor or control the video transceiver over the PSTN telephone line.

21. The video telephone line system of claim 20, further comprising a plurality of burglar detector sensors coupled to the security module, each burglar detector sensor being capable of detecting an intrusion of premises in one of the zones, and the security information comprises an output of one or more burglar detector sensors, wherein the sensor outputs are generated in response to the intrusion.

22. The video telephone line system of claim 21, further comprising a plurality of video cameras and a plurality of video recorders coupled to the security module, each video camera and each video recorder being capable of monitoring and recording, respectively, the intrusion in one of the zones, and the security information further comprises video signals from one or more video cameras, wherein the security module provides the video signals to the video recorders for recording a burglary in progress.

23. The video telephone line system of claim 21, further comprising a plurality of burglary alerting devices coupled to the security module, each burglary alerting device corresponding to one of the burglar detector sensors, wherein each burglary alerting device is activated in response to the security signal associated with the corresponding burglar detector sensor.

24. The video telephone line system of claim 21, wherein the burglary alerting device is selected from a group consisting of a strobe light and a siren.

25. The video telephone line system of claim 21, further comprising a fire control module coupled to the video transceiver, said fire control module being capable of receiving fire detection information, providing the fire detection information to the video transceiver, and generating a plurality of fire control signals in response to the fire detection information, each fire control signal corresponding to one of the zones, wherein the video transceiver is capable of providing the fire detection information over the PSTN telephone line.

26. The video telephone line system of claim 25, further comprising a plurality of fire detectors coupled to the fire control module, each fire detector being capable of detecting an occurrence of fire in at least one zone, and the fire detection information comprises an output of one or more fire detectors, wherein the detector outputs are generated in response to the occurrence of fire.

27. The video telephone line system of claim 25, further comprising a plurality of video cameras coupled to the fire control module, each video camera being capable of monitoring the occurrence of fire in at least one zone, and the fire detection information comprises one or more video signals from the video cameras.

28. The video telephone line system of claim 25, further comprising a plurality of fire alerting devices coupled to the fire control module, each fire alerting device corresponding to at least one of the fire detectors, wherein each fire alerting device is activated in response to the fire control signal associated with the corresponding fire detector.

29. The video telephone line system of claim 28, wherein the fire alerting devices are selected from a group consisting of bells and sirens.

30. The video telephone line system of claim 25, further comprising a fire extinguishing system coupled to the fire control module, wherein said fire extinguishing system is activated in response to one or more fire control signals.

31. The video telephone line system of claim 25, further comprising a fire extinguishing system coupled to the fire control module, wherein said fire extinguishing system is activated in response to an activation signal received over the PSTN telephone line.

32. The video telephone line system of claim 31, further comprising a second video transceiver coupled to the PSTN telephone line, wherein the video transceiver automatically dials the second video transceiver in response to at least one of the security signals and the fire control signals.

33. The video telephone line system of claim 32, wherein each of the security information and the fire detection information comprises one or more video signals, and the video transceiver transmits the video signals to the second video transceiver for viewing by a user of the second video transceiver.

34. The video telephone line system of claim 32, wherein a user of the second video transceiver is capable of conducting a video conference with a user of the video transceiver.

35. The video telephone line system of claim 32, further comprising a plurality of appliances coupled to the video transceiver, wherein the video transceiver is capable of extracting a plurality of control signals, from the PSTN telephone line, each appliance being responsive to its respective extracted application control signal.

36. The video telephone line system of claim 35, wherein the appliances a re selected from a group consisting of lighting, air conditioning, a cooking appliance, a garage door, a fountain, a sprinkler system, a heater and a television.

37. The video telephone line system of claim 35, wherein a user of the second video transceiver transmits one or more appliance control signals to the video transceiver to control the appliances.

38. The video telephone line system of claim 20, wherein the video transceiver is capable of providing the security information over the PSTN telephone line concurrently to a first video transceiver through a first PSTN connection and a second video transceiver through a second PSTN connection, wherein one of the first and second video transceivers can monitor and control the video transceiver while the other one of the first and second video transceivers only monitors the video transceiver.

* * * * *

UNITED STATES PATENT AND TRADEMARK OFFICE
CERTIFICATE OF CORRECTION

PATENT NO.   : 6,529,230 B1
DATED        : March 4, 2003
INVENTOR(S)  : Yuen Thub William Chong It is certified that error appears in the above-identified patent and that said Letters Patent is hereby corrected as shown below:

Column 14,
Line 1, replace "claim 4" with -- claim 1 --.

Column 15,
Line 53, replace "claim 21" with -- claim 23 --.
Line 55, replace "claim 21" with -- claim 20 --.

Column 16,
Line 50, replace "appliances a re" with -- appliances are --.

Signed and Sealed this

Fourth Day of May, 2004

JON W. DUDAS
*Acting Director of the United States Patent and Trademark Office*